US009415561B2

(12) United States Patent
Lindquist et al.

(10) Patent No.: US 9,415,561 B2
(45) Date of Patent: Aug. 16, 2016

(54) POST-FORMED SUCCESSIVELY PEELABLE COEXTRUDED POLYMER FILM

(71) Applicant: 3M INNOVATIVE PROPERTIES COMPANY, St. Paul, MN (US)

(72) Inventors: Timothy J. Lindquist, Woodbury, MN (US); Stephen A. Johnson, Woodbury, MN (US); Onur Sinan Yordem, St. Paul, MN (US); Myron K. Jordan, Apple Valley, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 224 days.

(21) Appl. No.: 14/144,097

(22) Filed: Dec. 30, 2013

(65) Prior Publication Data

US 2015/0183178 A1    Jul. 2, 2015

(51) Int. Cl.
*B32B 1/00* (2006.01)
*B32B 27/08* (2006.01)

(52) U.S. Cl.
CPC . *B32B 1/00* (2013.01); *B32B 27/08* (2013.01); *B32B 2250/24* (2013.01); *Y10T 428/24322* (2015.01); *Y10T 428/24628* (2015.01)

(58) Field of Classification Search
CPC ............ B32B 7/06; B32B 1/00; B32B 27/08; B32B 27/32; B32B 27/36; B32B 2250/05
USPC ............... 428/40.1, 41.7, 41.8, 174, 343, 354
See application file for complete search history.

(56) References Cited

U.S. PATENT DOCUMENTS

| 5,217,766 A | 6/1993 | Flonc |
| 6,179,948 B1 | 1/2001 | Merrill |

(Continued)

FOREIGN PATENT DOCUMENTS

| JP | H09151362 | 6/1997 |
| JP | H1044304 | 2/1998 |

(Continued)

OTHER PUBLICATIONS

"Television Remote Control is Leading Carrier of Bacteria in Patient's Hospital Room—New Study Out of the University of Arizona", PR Newswire, [retrieved from the internet on Mar. 4, 2014], URL <http://www.prnewswire.com/news-releases/television-remote-control-is-leading-carrier-of-bacteria-in-patients-hospital-room—new-study-out-of-the-university-of-arizona-55416657.html>, 2pgs.

(Continued)

*Primary Examiner* — Catherine A Simone

(57) ABSTRACT

Multilayered polymer films are configured so that successive layer packets can be delaminated in continuous sheet form from the remaining film. The films are compatible with known coextrusion manufacturing techniques, and can be made without adhesive layers between layer packets. The layer packets are individually peelable from the remainder of the film. Combinations of polymer compositions are used to allow non-adhesive polymer layers to be combined such that irreversible delamination of the film is likely to occur at interfaces between layer packet pairs. The films are post-formed, e.g. using heat and pressure, to deform the film from an initial flat or limp condition into a contoured shape that is self-supporting. The contoured shape may comprise regions of simple and/or complex curvature. Despite the permanent contoured shape, individual packets can still be successively peeled away to expose a fresh surface of the next layer packet, having the same contoured shape.

21 Claims, 14 Drawing Sheets

(56) References Cited

U.S. PATENT DOCUMENTS

| | | | |
|---|---|---|---|
| 6,461,709 | B1 | 10/2002 | Janssen |
| 6,777,055 | B2 | 8/2004 | Janssen |
| 6,788,463 | B2 | 9/2004 | Merrill |
| 7,104,776 | B2 | 9/2006 | Merrill |
| 7,153,122 | B2 | 12/2006 | Jackson |
| 7,153,123 | B2 | 12/2006 | Jackson |
| 7,721,910 | B2 | 5/2010 | Wallace |
| 7,794,811 | B2 * | 9/2010 | Mase .................... G06F 1/1626 428/174 |
| 2004/0121105 | A1 * | 6/2004 | Janssen .................... B32B 7/06 428/40.1 |
| 2010/0200596 | A1 | 8/2010 | Wallace |
| 2012/0119404 | A1 * | 5/2012 | Wallace .................. B32B 38/12 264/101 |
| 2013/0142975 | A1 * | 6/2013 | Wallace .................... B32B 1/02 428/36.7 |
| 2014/0065397 | A1 | 3/2014 | Johnson |

FOREIGN PATENT DOCUMENTS

| | | |
|---|---|---|
| JP | 4010399 B2 | 11/2007 |
| WO | WO 2011-062979 | 5/2011 |
| WO | WO 2012-064983 | 5/2012 |
| WO | WO 2012-092478 | 7/2012 |
| WO | WO 2012-167222 | 12/2012 |
| WO | WO 2013/191507 | 12/2013 |

OTHER PUBLICATIONS

Huslage, "A Quantitative Approach to Defining "High-Touch" Surfaces in Hospitals", Infection Control and Hospital Epidemiology, Aug. 2010, vol. 31, No. 8, pp. 850-853.

Kundrapu, "Daily Disinfection of High-Touch Surfaces in Isolation Rooms to Reduce Contamination of Healthcare Workers' Hands", Infection Control and Hospital Epidemiology, Oct. 2012, vol. 33, No. 10, pp. 1039-1042.

Nseir, "Risk of acquiring multidrug-resistant Gram-negative bacilli from prior room occupants in the intensive care unit", Clinical Microbiology and Infection, 2010, vol. 17, No. 8, pp. 1201-1208.

Russell, "Introduction of biocides into clinical practice and the impact on antibiotic-resistant bacteria", Journal of Applied Microbiology Symposium Supplement, 2002, vol. 92, pp. 121S-135S.

Sattar, "Promises and pitfalls of recent advances in chemical means of preventing the spread of nosocomial infections by environmental surfaces", American Journal of Infection Control, Jun. 2010, vol. 38, No. 5, pp. S34-S40.

Swanson, U.S. Appl. No. 61/831,939 "Successively Peelable Coextruded Polymer Film With Embedded Antimicrobial Layer(s)" filed on Jun. 6, 2013.

Brochure by 3M Industrial Adhesives and Tapes Division, "3M™ Scotchgard™ Multi-Layer Protective Film" 2011, 2 pages.

PCT International Search Report for PCT/US2014/070316, mailed Apr. 21, 2015.

* cited by examiner

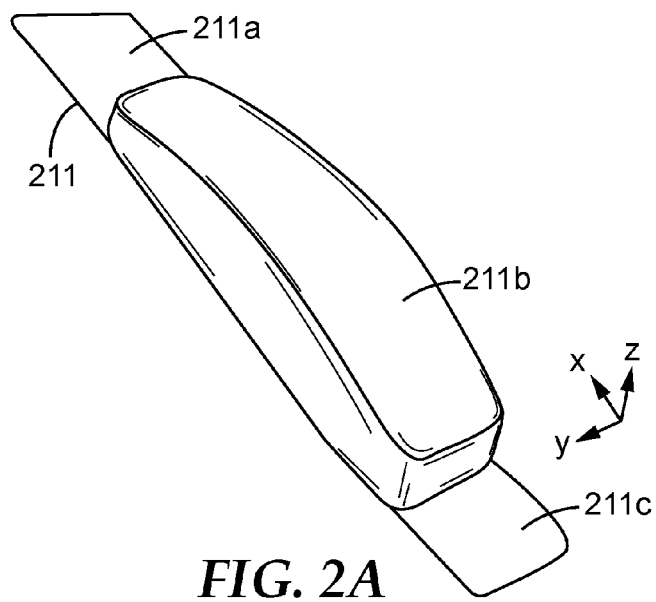
FIG. 2A
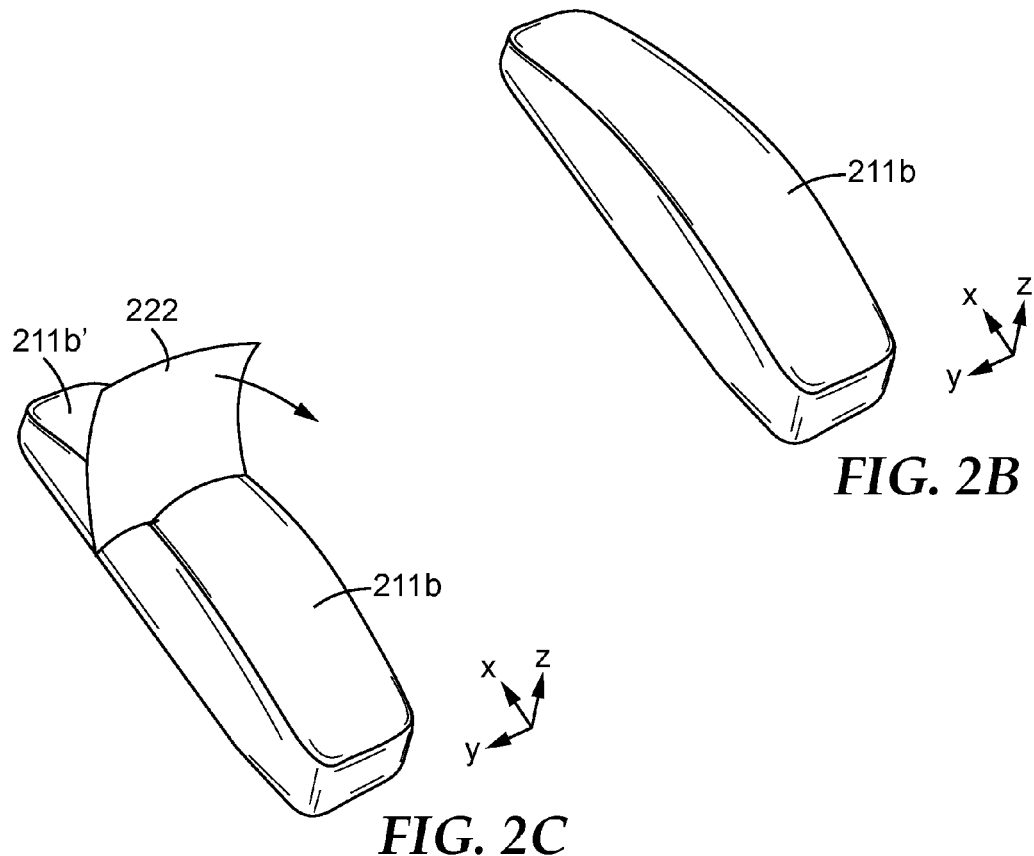
FIG. 2B
FIG. 2C

POST-FORMED SUCCESSIVELY PEELABLE COEXTRUDED POLYMER FILM

FIELD OF THE INVENTION

This invention relates generally to polymer films, with particular application to such films having a multi-layered construction in which individual layers or groups of layers can be peeled apart or delaminated from the remainder of the construction. The invention also relates to associated articles, systems, and methods.

BACKGROUND

Polyester films (this term includes co-polyester and polyester blend, alloy, and mixture films) have been heavily utilized over the last several decades in a great variety of applications. Oriented polyester film products have been produced as roll goods in both monolayer and coextruded multilayered formats. Frequently, protective liner films (also referred to as premasks) are applied to one or both outer surfaces of such films for protective purposes. The liner film typically provides only a temporary protective function while the useful polyester film it is attached to is in transit between manufacturing facilities and/or to the customer, or being handled or processed. The liner film is designed to be removed by an in-house converting process or by the customer before or upon converting or installation of the useful polyester film by simply peeling the liner film, in sheet form, away from the useful polyester film, and then discarding or recycling the liner film. The liner film typically does not provide any functionality comparable to that of the useful polyester film. For example, if the useful polyester film is an optical polarizing film, the liner film does not provide any meaningful optical functionality or polarizing functionality.

It is also known to design some multilayered polymer films so that constituent layers or sheets, each with similar functionality, can be peeled apart or delaminated from the remainder of the film. One use for such films is in anti-graffiti applications. In such applications, the film in its original form may be applied to a mirror, window, or other item to be protected. The film is made up of highly transparent polymer materials, so that the appearance of the mirror, window, or other item is minimally affected by the film. If graffiti is applied to the exposed surface of the film, an outermost portion of the film, on which the graffiti resides, can be peeled away in continuous sheet form from the remainder of the film. After removal of the outermost portion, the remaining film stays in place on the item, which now appears clean and graffiti-free again. A portion of the film that was originally interior to the film, immediately beneath the outermost portion, becomes the new outermost layer. If graffiti is again applied, the new graffiti will reside on the exposed surface of the new outermost layer. The new graffiti can be removed by peeling away the new outermost layer in continuous sheet form from the remainder of the film. After removal of the new outermost portion, the remaining film stays in place on the item, which again appears clean and graffiti-free. The original film product can be made with up to 4 constituent sheets that can be sequentially removed in this manner to provide protection against repeated acts of defacement. To facilitate removal of only one sheet at a time, the product is made with kiss-cut tab-like features of differing depths near the edge of the film.

BRIEF SUMMARY

Known multilayered polymer films designed for delamination are typically made by first manufacturing the constituent sheets, and then laminating the sheets together with pressure sensitive adhesive (PSA) layers. This manufacturing approach, and film design, introduces inherent limitations in the types of films that can be made. For example, the constituent sheets need to be physically thick enough to allow the individual sheets to be processed by automated film-handling equipment without excessive tears or breakage. This places a lower limit on the thickness of the individual sheets, and a concomitant upper limit on the number of such sheets that can be laminated together to form a multilayered film that is sufficiently thin and flexible. Also, laminating sheets together that were manufactured separately tends to expose the sheets to contamination.

We have developed a new family of multilayered polymer films that are configured so that successive constituent layer packets can be delaminated in continuous sheet form from the remaining film. Here, a layer packet refers to a plurality of individual layers that are bonded to each other and that function or act like a single sheet for purposes of delamination. The new films are preferably compatible with known coextrusion manufacturing techniques to permit the layer packets to be much thinner than if a lamination manufacturing technique were used. Also, by joining the layers together in a single coextruding process, typically at elevated temperature, the potential for contaminating the interfaces between the layers is greatly reduced. We have also now demonstrated that multilayered polymer films such as these can be post-formed or molded into a permanent self-supporting contoured shape, and that, despite the contoured shape, the individual packets can still be successively peeled away to expose a fresh surface of the next layer packet, having the same contoured shape.

The new films are also preferably made without the use of adhesive layers between layer packets that are tailored to be individually peelable from the remainder of the film. (An adhesive layer in this regard refers to a layer that is tacky at room temperature.) Instead, combinations of polymer compositions are used that allow non-adhesive polymer layers to be combined in such a way that delamination of the film is likely to occur along a plurality of delamination surfaces corresponding to interfaces between adjacent layer packets. In some cases, the peel strength at the delamination surfaces is lower than the peel strength at other layer interfaces within the film. The absence of an adhesive between peelable layer packets results in the delamination being irreversible: after a layer packet is delaminated from the remainder of the film, the layer packet cannot thereafter be permanently or reliably re-affixed to the film simply by pressing the delaminated layer packet against the film.

We describe herein, inter alia, films that comprise a stack of polymer layers, the polymer layers being organized into layer packets, each of the layer packets having at least two of the polymer layers. Attachment between adjacent layer packets is weak enough to permit the layer packets to be separately irreversibly delaminated from a remainder of the stack, and the stack is configured to promote such irreversible delamination between such layer packets. All of the polymer layers in the stack of polymer layers have respective polymer compositions that are coextrudable with each other. Furthermore, the film has a self-supporting contoured shape.

The contoured shape may include a region that is curved in a first cross-sectional plane but not curved in a second cross-sectional plane perpendicular to the first cross-sectional plane. The contoured shape may alternatively or additionally include a region that is curved in the first cross-sectional plane and also curved in the second cross-sectional plane perpendicular to the first cross-sectional plane.

The stack may be configured such that for every pair of adjacent layer packets in the stack, attachment between the layer packets is weaker than attachment between the polymer layers within the layer packets, such that irreversible delamination tends to occur between the layer packets rather than within the layer packets. Attachment between adjacent layer packets may be characterized by a first peel force, and a weakest attachment of polymer layers within each layer packet may be characterized by a second peel force, and the second peel force may be at least two times the first peel force. An attachment between any two adjacent layer packets may be characterized by a peel force in a range from 2 to 100 grams per inch (0.8 to 38.6 N/n).

The polymer layers may be arranged in, for example, a repeating AB sequence, or a repeating ABC sequence. In the latter case, attachment between polymer layers A and C may be weaker than attachment between polymer layers A and B, and may also be weaker than attachment between polymer layers B and C.

All of the polymer layers in the stack of polymer layers may have respective polymer compositions that are melt processable at a melt temperature of 204 degrees C. (400 degrees F.) or greater. At least some of the polymer layers in the stack may be oriented and have a birefringence of at least 0.05. In some cases, none of the polymer layers that are disposed at interfaces of adjacent layer packets are tacky at room temperature. In some cases, each of the layer packets in the stack may have a thickness of no more than 2 mils (50 microns). The polymer layers may be organized into at least N layer packets, where N is at least 5. In some cases N may be at least 10, and the film may have an overall thickness of no more than 15 mils (380 microns).

We also describe the multilayered polymer films in combination with other elements. For example, a multilayered polymer film as set forth above can be combined with an article having a contoured surface, the contoured shape of the film mating with the contoured surface of the article. The article may include a display having a display surface, and the display surface may be part of the contoured surface. The article may also or alternatively include a component having a moveable surface, the moveable surface being part of the contoured surface, and the film may mate with the moveable surface and may flex to accommodate movement of the component.

The stack of polymer layers may have an average transmission over visible wavelengths of at least 80% and an optical haze of less than 15%. The stack of polymer layers may in some cases have an optical haze of less than 8%. The stack may be configured with access tabs that provide access to interfaces between adjacent layer packets, and the access tabs may be defined by a set of kiss-cut holes of different depths. The stack may also or alternatively include markings that indicate how many layer packets are present in the film.

We also describe methods, including a method that includes providing a multilayered polymer film, providing a workpiece having a contoured workpiece surface, heating the multilayered polymer film, molding the heated multilayered polymer film against the contoured workpiece surface to deform the film into a contoured shape that mates with the contoured workpiece surface, and cooling the film such that the film with its contoured shape becomes self-supporting. The multilayered polymer film typically includes a stack of polymer layers, the polymer layers being organized into layer packets, each of the layer packets having at least two of the polymer layers, attachment between adjacent layer packets being weak enough to permit the layer packets to be separately irreversibly delaminated from a remainder of the stack, all of the polymer layers in the stack of polymer layers having respective polymer compositions that are coextrudable with each other.

The respective polymer compositions may have respective glass transition temperatures, and the heating may include heating the film above at least one such glass transition temperature. The method may also include separating the molded film from the workpiece. The separate irreversible delamination capability of layer packets in the multilayered polymer film may be substantially maintained after the heating, molding, and cooling procedures. The providing the multilayered polymer film may include coextruding the polymer compositions at an elevated temperature, and the heating may be at least partially accomplished as a result of the coextruding.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 2A is a perspective view of the multilayered polymer film of FIG. 1 after the molding operation associated with FIG. 1, the molded film having a self-supporting contoured shape, and FIG. 2B is the same molded multilayered polymer film after excess molded film portions have been removed;

FIG. 2C depicts the same molded multilayered polymer film of FIG. 2B, but shows a constituent layer packet being delaminated in continuous sheet form from the remaining molded film;

In the figures, like reference numerals designate like elements.

DETAILED DESCRIPTION OF ILLUSTRATIVE EMBODIMENTS

We have developed new multilayered polymer films in which individual layer packets can be delaminated, or peeled away, from a remainder of the film in continuous sheet form, even after the film is post-formed or molded to assume a particular contoured shape that makes the film self-supporting. A stack of polymer layers are arranged or organized to form the layer packets, each layer packet having at least two of the polymer layers. The films can be made by coextruding all the polymer layers in the stack, with no need to laminate separately manufactured films or layers in order to construct the stack. This allows the individual peelable layer packets to be made much thinner than could otherwise be done, such that more separately peelable sheets can be included in a film of a given overall thickness. Coextruded layers are also less susceptible to contamination during manufacturing than layers that are separately made and then laminated together. Some of the peelable polymer films described in commonly assigned U.S. patent application Ser. No. 13/596,425, "Coextruded Polymer Film Configured for Successive Irreversible Delamination", filed Aug. 28, 2012, and 61/831,939, "Successively Peelable Coextruded Polymer Film With Embedded Antimicrobial Layer(s)", filed Jun. 6, 2013, are suitable for use with the post-forming and molding procedures discussed herein. Those two patent applications are incorporated herein by reference.

Figure 1:
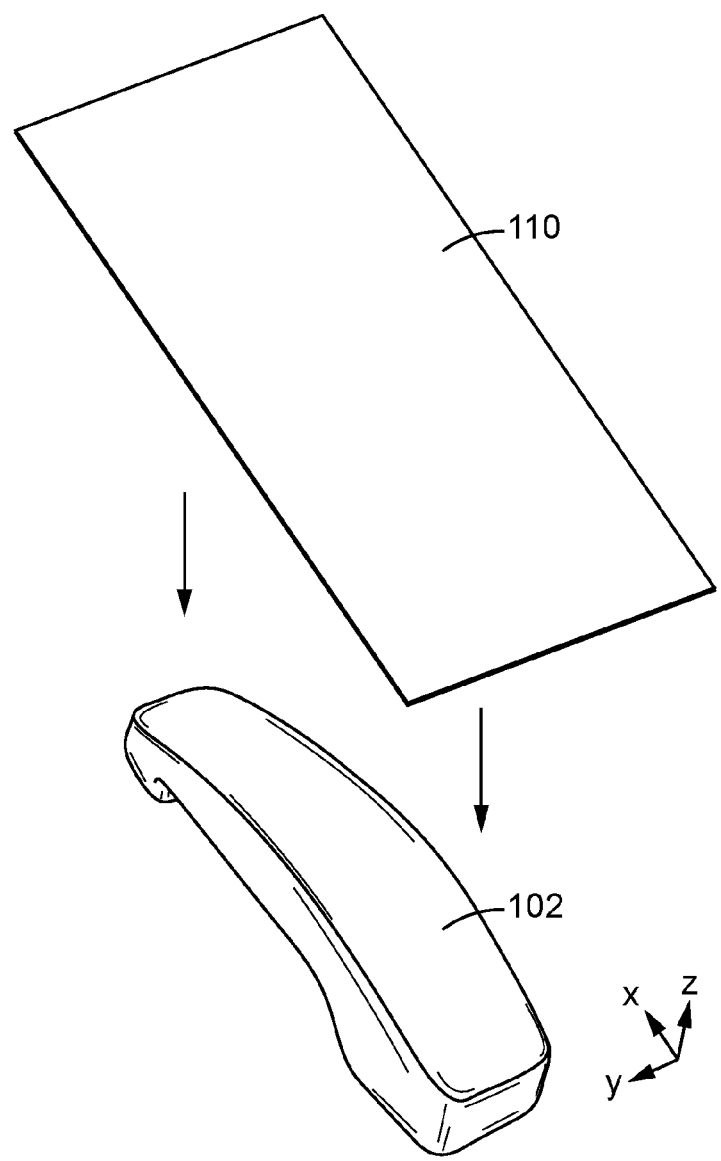
FIG. 1 is a schematic perspective view of a multilayered polymer film about to be molded against a workpiece having a contoured surface, the polymer film being configured for successive irreversible delamination.

An exemplary multilayered polymer film 110, which is adapted for successive irreversible delamination, is shown schematically in FIG. 1 as it is about to be molded against a workpiece 102 having a contoured surface. The film and workpiece are shown in the context of a Cartesian x-y-z coordinate system. The film 110 is assumed to lie in a plane parallel to the x-y plane. The workpiece 102 has a curved or otherwise irregular (non-planar) surface which deviates in the z-direction, such curved or irregular (non-planar) surfaces being referred to as contoured surfaces. The contoured surface may have a simple curvature, i.e., curved or otherwise irregular in one cross-sectional plane but not in an orthogonal second sectional plane, and it may also (e.g. at a different place on the surface) or alternatively have a complex curvature, i.e., curved or otherwise irregular in two orthogonal cross-sectional planes. In the figure, the workpiece 102 is illustrated as a telephone handset, or a mold shaped like a telephone handset. This is merely an example, and alternative workpieces can also be used.

Before molding, the film 110 has a stack of polymer layers organized into layer packets, each packet having at least two of the polymer layers. The film 110 is configured so that successive layer packets can be irreversibly delaminated in continuous sheet form from the remaining film or stack. The film 110, or at least the stack of polymer layers which forms at least part of the film, is compatible with known coextrusion manufacturing techniques, and can be made without adhesive layers between layer packets. Combinations of polymer compositions are used to allow non-adhesive polymer layers to be combined such that irreversible delamination of the film 110 is likely to occur at interfaces between layer packet pairs, also referred to as delamination surfaces. The film 110 is thus adapted to be delaminated or peeled before molding.

Other features of the film 110 may include: for every pair of adjacent layer packets in the stack, attachment between the layer packets may be weaker than attachment between the polymer layers within the layer packets, such that irreversible delamination tends to occur between the layer packets rather than within the layer packets; the attachment between adjacent layer packets may be characterized by a first peel force, e.g. in a range from 2 to 100 grams per inch (0.8 to 38.6 N/m), and a weakest attachment of polymer layers within each layer packet may be characterized by a second peel force, and the second peel force may be at least two times the first peel force; all of the polymer layers in the stack of polymer layers have respective polymer compositions that are melt processable at a melt temperature of 204 degrees C. (400 degrees F.) or greater; at least some of the polymer layers in the stack may be oriented, and may have a birefringence of at least 0.05; none of the polymer layers that are disposed at interfaces of adjacent layer packets are tacky at room temperature; each of the layer packets in the stack may have a thickness of no more than 2 mils (50 microns); the polymer layers may be organized into at least N layer packets, where N is at least 5, or instead, N may be at least 10 and the film may have an overall thickness of no more than 15 mils (380 microns); the stack of polymer layers may have an average transmission over visible wavelengths of at least 80% and an optical haze of less than 15% or less than 8%; the stack may be configured with access tabs that provide access to interfaces between adjacent layer packets, and the access tabs may be defined by a set of kiss-cut holes of different depths; the stack of polymer layers may include markings that indicate how many layer packets are present in the film.

The film 110 is then post-formed, e.g. using heat and pressure, and using the workpiece 102 as a mold, to deform the film 110 from an initial flat or limp condition into a contoured shape that is self-supporting. The contoured shape may comprise regions of simple and/or complex curvature, and the curvature may be or include a smooth continuous curve and/or an angled or faceted (e.g. piecewise linear or piecewise planar) curve. In the case of the telephone handset workpiece 102, the workpiece surface (e.g., the upper portion of the workpiece) can be seen to have curvature in the x-z plane as well as in the perpendicular y-z plane, and the contoured shape of the post-formed or molded film can be expected to have substantially the same topographical properties. We have found that despite the permanent contoured shape of the molded film, and the heat and pressure applied to the film during the post-forming procedure, individual packets of the molded film can still be successively peeled away to expose a fresh surface of the next layer packet, having the same contoured shape. Except for having the self-supporting contoured shape, the post-formed or molded film may substantially retain the other properties and characteristics discussed above in connection with the film 110.

A schematic depiction of a post-formed or molded film that may be the result of molding the film 110 against the workpiece 102 is shown as molded film 211 in FIG. 2A. To the extent the original film is oversized relative to the workpiece, the molded film 211 may have one or more excess portions 211a, 211c in addition to a main portion 211b. The main portion 211b may have a contoured shape substantially matching that of an upper portion of a contoured workpiece such as workpiece 102, while the excess portions 211a, 211c may be flat to substantially match, for example, a flat substrate upon which the workpiece is placed, or they may have another shape. In any case, the molded film 211 has a contoured shape, and that shape is substantially self-supporting. That is, the molded film, in the absence of any distributed attachment to or distributed support from any other shaped rigid member, has sufficient rigidity on its own that it substantially maintains its contoured shape by itself under the influence of gravity, e.g., if it is placed upon a tabletop or held lightly in a person's hands. The molded film 211 shown in FIG. 2A may thus have the depicted contoured shape even if it is unattached to anything else and simply placed upon a tabletop or the like, and such contoured shape may be maintained substantially permanently, e.g., for at least one hour, or at least one day, or at least one week, or for another time period of interest such as the time it takes to transport the molded film from the molding station to a station where it is attached to a useful object such as a telephone, telephone accessory, or telephone component, a TV remote (for handheld use), a keyboard, a keypad, a display device, or any other suitable useful object having a contoured surface.

The excess portions 211a, 211c may be trimmed away or otherwise removed from the main portion 211b with a knife or other suitable cutting tool so that the molded film no longer includes the excess portions, as shown in FIG. 2B. The molded film as modified in this fashion may still have substantially the same contoured shape corresponding to that of the workpiece, and the shape may still be self-supporting. Moreover, individual layer packets can be delaminated from a reminder of the molded film, as shown schematically in FIG. 2C. In that figure, an outermost layer packet 222 is separated in continuous sheet-like form from a remainder of the molded film and delaminated or peeled away from such film. The removal of the layer packet 222 leaves behind a molded film 211b" which may be substantially similar to the molded film portion 211, except that one of the original layer packets is now absent. The molded film 211b' may have substantially the same self-supporting contoured shape as the main portion 211. If additional layer packets are included in the stack of polymer layers of the original film 110 or 211, still more layer packets may be delaminated or peeled away from the molded film 211b' in succession.

Such successive delamination may be useful in order to maintain cleanliness or functionality of a contoured object. For example, the molded film portion 211b may be bonded to a telephone handset—or other useful object having a contoured shape corresponding to that of the molded film—using a contact cement, adhesive, or by other suitable means, after which the (covered) telephone handset may be placed into service. Over time, the outer surface of the molded film may become dirty, defaced, or otherwise damaged, e.g., by the deposit and collection of germs or other microbes thereon. When the damage reaches a specified threshold, or on a regular cleaning or maintenance schedule, the handset can be cleaned, renewed, or refreshed by simply delaminating and peeling away an initially outermost first layer packet to expose a second layer packet, and the (still covered) telephone handset can again be placed into service. Immediately after removal of the first layer packet, in exemplary embodiments, the exterior surface of the second layer packet is initially clean and pristine because of the protection from contamination that was provided by the first layer packet. Eventually, with further use, the surface of the second layer packet may also become dirty, defaced, or otherwise damaged to an unacceptable level, whereupon, depending on the film design, the workpiece may be renewed yet again by delaminating and peeling away the second layer packet to expose a pristine third layer packet, and thereafter delaminating and peeling away the third layer packet to expose a pristine fourth layer packet, and so forth.

FIGS. 3A through 4D show another sequence in which a multilayered polymer film is molded to have a self-supporting contoured shape and then bonded to a workpiece, after which layer packets thereof are successively irreversibly delaminated from the remainder of the molded film and the workpiece. An exemplary multilayered polymer film before molding or post-forming is shown schematically in FIG. 3A. In this figure, film 310 is a multilayered polymer film configured so that successive constituent layer packets can be delaminated in continuous sheet form from the remaining film. The film 310 is made up of a stack 320 of polymer layers. Although an adhesive may be used to attach the stack 320 to another object, the stack 320 itself preferably contains no adhesives. The film 310 is typically relatively thin and flexible such that it can be applied to, and conform to, workpieces that are contoured rather than flat. For example, the film 310 may have an overall thickness of no more than about 510, or 380, or 300, or 200, or 100, or 50, or even 25 micrometers. Alternatively, in some cases it may be desirable for the film 310 to be relatively thick and inflexible or rigid. The film 310 may lie generally in an x-y plane of an x-y-z Cartesian coordinate system.

Figure 3A:
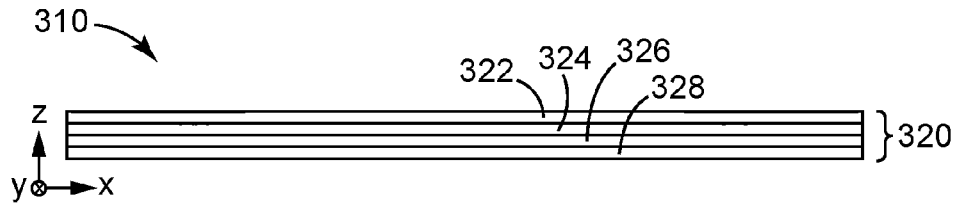
FIG. 3A is a schematic side or sectional view of a multilayered polymer film that is configured for successive irreversible delamination.

Individual polymer layers of the stack 320 are not shown in FIG. 3A, but the individual layers are organized into repeating groups of layers referred to as layer packets, and these packets are shown and labeled as layer packets 322, 324, 326, and 328. Each layer packet is characterized by a front and back major surface, and at least two of the individual polymer layers are disposed between the front and back major surfaces of each layer packet. Layer packet 322 has a front major surface and a back major surface. Layer packet 324 has a front major surface (which is in intimate contact with the back major surface of packet 322) and a back major surface. Layer packet 326 has a front major surface (which is in intimate contact with the back major surface of packet 324) and a back major surface. Layer packet 328 has a front major surface (which is in intimate contact with the back major surface of packet 326) and a back major surface.

The reader will understand that the terms "front", "back", and the like (e.g. front-most, back-most) are used throughout this document for convenience in order to specify the ordering of the layers with respect to outer major surfaces of the film or stack, and should not be construed in a limiting way. Thus, even for films or packets that are intended for use such that one outer major surface is to face outwardly (front) and the other outer major surface is to face inwardly (back), either of these outer major surfaces may be considered the "front", and the other outer major surface would then be considered the "back".

To reduce cost and complexity of the film design, the individual polymer layers of the stack 320 may be arranged in a repeating pattern such as an AB pattern (e.g. ABABAB . . . ), an ABC pattern (e.g. ABCABCABC . . . ), an ADBC pattern (e.g. ADBCADBC . . . ), or other described patterns, with the smallest group or set of layers in the stack that repeat corresponding to a layer packet. Numerous such layer packets can be included in the polymer stack 320 and in the multilayered film 310. By appropriate selection of polymer composition for the polymer layers A, B, C, etc., the layer-to-layer bond strength (sometimes also referred to herein as peel strength or peel force) can be made strong enough so that the film does not fall apart or delaminate unintentionally, e.g. while a user is manipulating it while molding it or applying it to a workpiece, but weak enough so that the user can delaminate the various layer packets from the remainder of the film without excessive force. In some cases, the layer-to-layer bond strength can be weaker along interfaces between adjacent layer packets than the bond strength for other layer interfaces within the stack, to facilitate delaminating or peeling away the layer packets, one layer packet at a time, from the remaining film.

The film 310 can be made by coextruding all the polymer layers in the stack 320, with no need to laminate separately manufactured films or layers in order to construct the stack. This allows the individual peelable layer packets to be made much thinner than could otherwise be done, such that more separately peelable sheets can be included in a film of a specified overall thickness. Optional post-casting steps, such as orienting the multilayered extrudate by stretching in a machine direction and/or in a transverse direction, can also be employed. The orienting can cause none, some, or all of the polymer layers in the film to become birefringent, depending on the polymer materials chosen and the processing conditions. The films can be made without the need for any pressure sensitive adhesives, or other kinds of adhesives, in the stack of polymer layers, or at least in the polymer layers that are disposed at the interfaces between adjacent layer packets. This can simplify manufacture and also produce film surfaces, which are interior to the film in the initial manufactured product but that later become exterior surfaces as layer packets are peeled away during use, that are more pristine than can be achieved in a film made by using separate lamination steps. If desired, the polymer layers at these surfaces can comprise one or more additives, e.g., one or more antimicrobial agents to provide the film product with an antimicrobial functionality, that can be renewed or refreshed simply by tearing or peeling away the outermost layer packet. If desired, two or more layer stacks may be bonded together with a PSA or other adhesive, or other suitable bonding material, to create a compound film product, whether or not the stacks themselves contain any PSA layers or other adhesive layers.

In exemplary embodiments, the layer stack 320 and its constituent layer packets are non-porous. Furthermore, each polymer layer in the layer stack may be non-porous. Non-porous layer packets are advantageous because they provide an effective barrier to water, oils, or other contaminant-carrying liquids or substances. These barrier properties can thus ensure that layer packets that are internal to the layer stack, i.e. layer packets that have not yet been exposed to air at a given point in time in the lifetime of the product, remain substantially contaminant-free and pristine.

Some or all of the layer packets may have the same or similar number of individual polymer layers, and the arrangement of the individual polymer layers within the layer packets may be the same or similar for some or all of the layer packets. Each layer packet includes a front-most polymer layer, a back-most polymer layer, and in some cases one or more additional polymer layers interior to the layer packet between the front-most and back-most polymer layers. For every pair of adjacent layer packets in the stack, attachment between the layer packets, which may be measured or quantified in terms of peel strength or peel force, is strong enough to avoid unintentional delamination, but weak enough to allow the user to delaminate the layer packets without excessive force. For example, the peel force between adjacent layer packets can be tailored to be greater than zero, e.g., at least 1 gram/inch, or at least 2 grams/inch. Peel force units of grams/inch (or grams/inch width), abbreviated g/in, are sometimes referred to as grams per linear inch, abbreviated gli. The quantity 1.0 g/in equals 0.3860886 N/m. The peel force between adjacent layer packets can be tailored to be in a range from 2 to 100 grams per inch (0.8 to 38.6 N/m).

In cases where the layer stack includes more than two different types of polymer layers, such that each layer packet includes at least three polymer layers of different composition, the stack can be designed so that the peel force is weaker at interfaces between layer packets than at other layer interfaces within the stack, such that irreversible delamination tends to occur between adjacent layer packets rather than within any of the layer packets. Regardless of how many individual polymer layers are included in each layer packet, the layer stack can also be provided with access tabs that facilitate or further facilitate delaminating the film selectively at the interfaces between layer packets rather than at interfaces within the layer packets. The interfaces between layer packets are thus sometimes also referred to herein as delamination surfaces because the film stack can be configured to preferentially delaminate at those interfaces or surfaces.

At least some of the individual polymer layers in the stack 320, including at least one (and typically more than one) polymer layer that is interior to the film in the initial finished product, may include one or more additives, such as one or more antimicrobial agents in an effective amount to limit the growth of germs or other microbes that may accumulate on the surface. To reduce cost, the additive(s) can be added to only some of the polymer layers, such that some of the polymer layers in the stack 320 contain an effective amount of the additive(s), while other polymer layers in the stack do not. The polymer layers that contain an effective amount of the one or more additives may be the front-most layers in each of the layer packets so that, for example, when a particular layer packet is exposed to air and to physical contact after the delamination and removal of a layer packet immediately above or in front of it, the particular layer packet in question presents a polymer layer that contains the additive(s) to the environment.

Figure 3B:
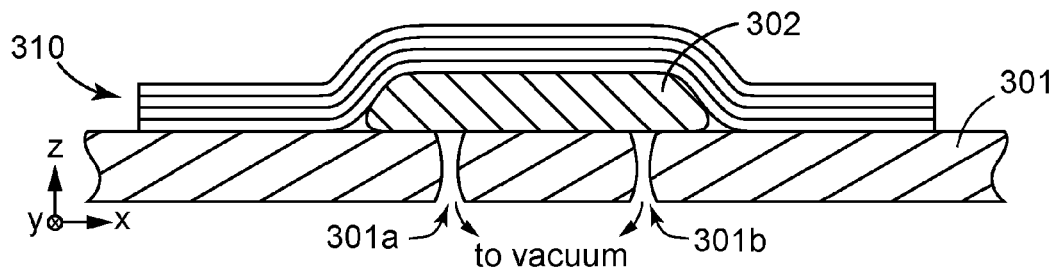
FIG. 3B is a schematic side or sectional view of the film of FIG. 3A during a molding operation in which it is molded against a workpiece having a contoured surface so that the film also acquires a contoured shape.

FIG. 3B depicts the multilayered polymer film 310 during a post-forming or molding operation in which the film 310 is molded against a workpiece having a contoured surface so that the film also acquires a contoured shape, typically one that substantially corresponds to the contoured surface of the workpiece, or a portion thereof. The film 310 is laid against a workpiece 302 which has a contoured surface, and which rests upon a substrate 301. The substrate 301 has holes or perforations 301a, 301b which can be coupled to a vacuum. The physical contact between the workpiece 302 and the substrate 301 is imperfect, e.g., microscopic gaps may exist between the workpiece and the substrate, such that when the vacuum is coupled to the perforations 301a, 301b, the vacuum also couples to the outer edges of the workpiece 302, where, due to the presence of atmospheric air pressure on the other side of the film 310, differential air pressure forces the film 310 firmly against the contoured surface of the workpiece 302 and the upper surface of the substrate 301. In alternative embodiments the workpiece 302 and substrate 301 may be combined into a single workpiece or mold, or may be further subdivided into additional distinct pieces.

Heat may be supplied during the post-forming or molding operation to heat the multilayered polymer film 310 and to soften at least some of its constituent polymer layers. For example, the polymer layers in the stack may have respective polymer compositions and respective glass transition temperatures, and the heating may heat the film above at least one such glass transition temperature. The heating however also preferably does not heat the film so high that the layer structure of the film is destroyed, or that the irreversible delamination characteristic of the film is lost. The heating can be supplied by suitable heating devices that convey the heat to the film 310 by convection, conduction, and/or radiation. In some cases, the heating may be provided, in whole or in part, as a byproduct of the manufacturing process of the film 310. For example, during film formation, the polymer materials that make up the polymer layers in the stack may be heated for coextrusion and passed through a heated die; while these layers are cooling but when at least some of the polymer layers are still at a temperature above their glass transition temperature, such a heated film may be post-formed or molded against a workpiece as shown generally in FIG. 3B.

After the post-forming or molding, the multilayered polymer film can be cooled and separated from the mold or workpiece. The resulting molded multilayered polymer film 311 has acquired a contoured shape through the molding process, the contoured shape corresponding substantially to the contoured surface of the mold or workpiece. The contoured shape of the film 311 includes a protuberance 312, and is self-supporting and substantially permanent, such that the molded film 311 can be placed upon a tabletop or similar support and maintain its contoured shape under the force of gravity. The molded film 311 has a molded stack 320' of polymer layers, the stack being labeled 320' to distinguish it from the stack 320 of polymer layers from the original film 310 before post-forming or molding. Similarly, the molded film 311 has layer packets 322', 324', 326', and 328', which may correspond respectively to the layer packets 322, 324, 326 in the original film 310, except that they are molded or shaped.

Figure 3C:
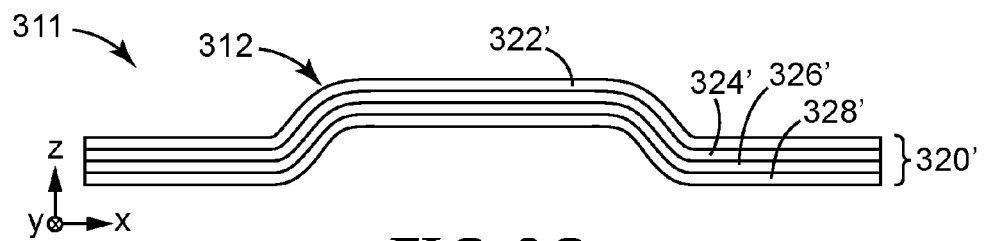
FIG. 3C is a schematic side or sectional view of the film of FIG. 3B after separating the molded film from the mold, the molded film being self-supporting with a permanent contoured shape.

The contoured shape of the molded film 311 is curved or otherwise irregular in the x-z plane as shown in FIG. 3C to form the protuberance 312. In the orthogonal y-z cross-sectional plane, the contoured shape may be flat or straight, i.e., not curved and not irregular, such that the contoured shape has a simple curvature. Alternatively, the contoured shape may be curved or otherwise irregular in the y-z plane, such that the contoured shape has a complex curvature. In either case, the molded film 311 may substantially maintain the successive delamination capability of the original multilayered polymer film 310, i.e., the layer packets 322', 324', 326', and 328' may be adapted for separate irreversible delamination from a remainder of the stack 320'.

Figure 4A:
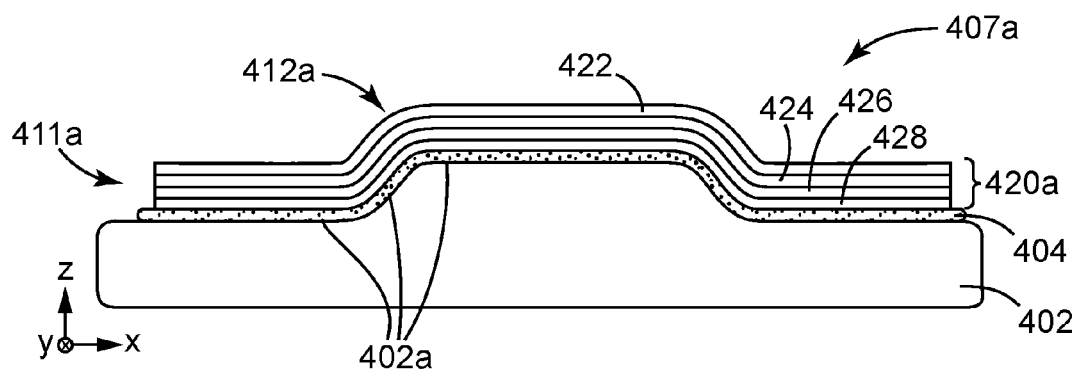
FIG. 4A is a schematic side or sectional view of a molded multilayered polymer film such as that of FIG. 3C in combination with a contoured workpiece, the molded film being bonded to the workpiece.

In FIG. 4A, an article 407 comprises a molded multilayered polymer film 411a attached to a contoured surface 402a of a workpiece 402 by an adhesive layer 404. The molded film 411a, which may be the same as or similar to the molded film 311 described above, has a stack 420a of polymer layers organized or arranged into layer packets 422, 424, 426, 428, each of these layer packets having at least two of the polymer layers. Note that the adhesive layer 404 is provided at an exterior of the stack 420a, rather than between layer packets. Prior to attachment to the workpiece 402, the molded film 411a may include a release liner to cover the adhesive layer 404 during storage or transport of the molded film. If desired, the adhesive layer 404 and release liner may also be part of the film during the post-forming or molding process. The contoured shape of the film 411a is self-supporting and substantially permanent, despite the fact that it is attached to the workpiece 402 by the adhesive layer 404. For example, if the film 411a could be detached from the workpiece 402 by removal of the adhesive layer 404, the film 411a would be mechanically stable enough under the force of gravity that its contoured shape would be substantially maintained if the film 411a was placed upon a tabletop or similar support. The contoured shape of the film 411a includes a protuberance 412a, and may substantially conform to or match the contoured surface 402a of the workpiece. The workpiece 402 may be or comprise, for example, any useful article or device that is subject to repeated touching, contamination, or damage. Examples include telephones, and telephone accessories and components, TV remotes (for handheld use), keyboards, keypads, and display devices, but these examples should not be construed in a limiting way.

Figure 4B:
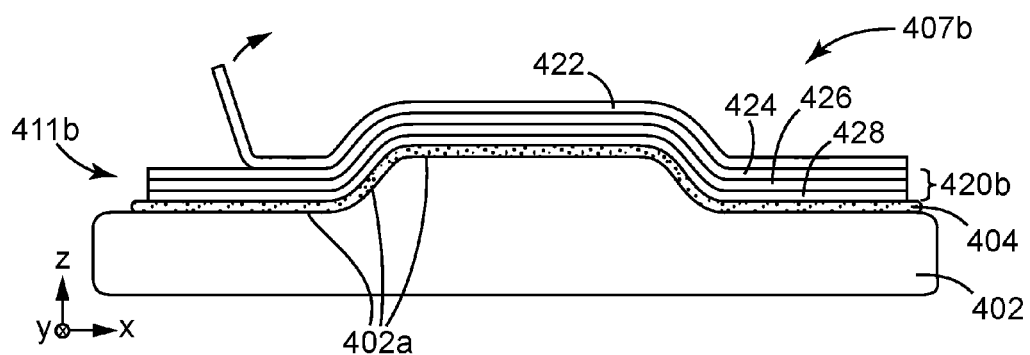
FIGS. 4B through 4D are schematic side or sectional views of the combination of FIG. 4A but where successive layer packets are delaminated in continuous sheet form from the remaining molded film.
Figure 4C:
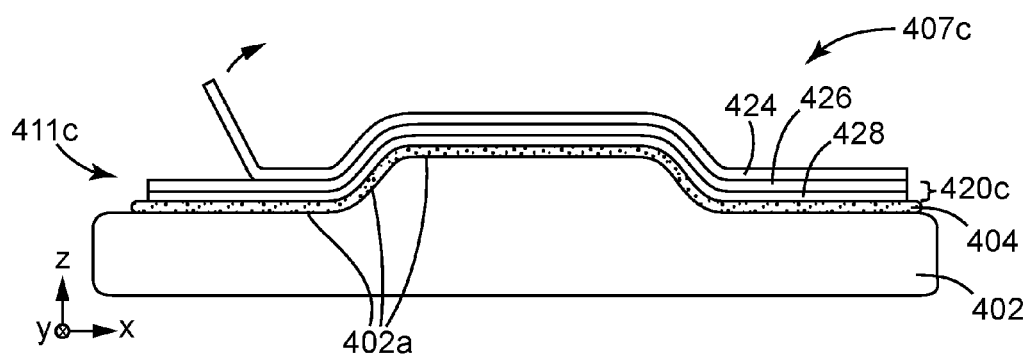
Figure 4D:
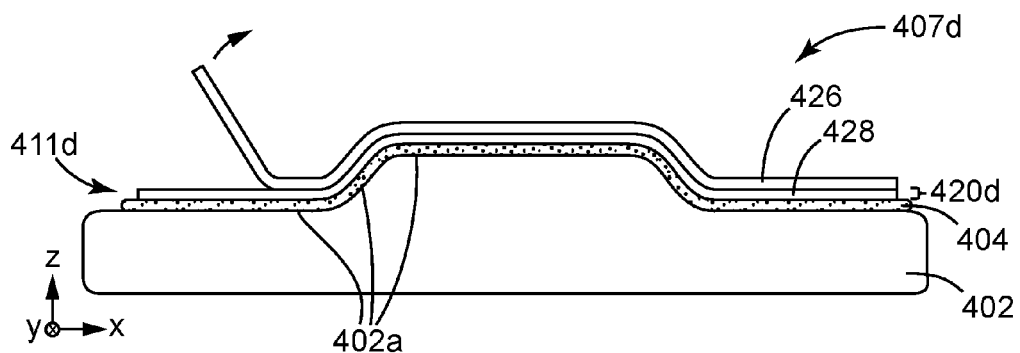

FIGS. 4B through 4D show how the article 407a changes as individual layer packets are delaminated or peeled away from the molded film. In FIG. 4B, after the outermost layer packet 422 has served its useful purpose, it is irreversibly delaminated from the remainder of the molded film to produce a modified article 407b. The delamination exposes a clean or pristine surface of the layer packet 424. It also produces a modified molded film 411b with a modified stack 420b of polymer layers organized into the layer packets 424, 426, and 428. The workpiece 402 and adhesive layer 404 may remain the same.

In FIG. 4C, after the outermost layer packet 424 has served its useful purpose, it is irreversibly delaminated from the remainder of the molded film to produce a modified article 407c. The delamination exposes a clean or pristine surface of the layer packet 426. It also produces a modified molded film 411c with a modified stack 420c of polymer layers organized into the layer packets 426 and 428. The workpiece 402 and adhesive layer 404 may remain the same.

In FIG. 4D, after the outermost layer packet 426 has served its useful purpose, it is irreversibly delaminated from the remainder of the molded film to produce a modified article 407d. The delamination exposes a clean or pristine surface of the layer packet 428. It also produces a modified molded film 411d with a modified stack 420d of polymer layers organized into the sole remaining layer packet 428. The workpiece 402 and adhesive layer 404 may remain the same.

The reader will understand that although the films 310, 311, and 411 are shown as having four layer packets, in other cases the molded film, as well as the original multilayered polymer film before molding, may contain more than four layer packets, or, if desired, fewer than four but at least two layer packets. One benefit of making the individual polymer layers and layer packets very thin, such as can be done in a single coextrusion operation, is that many more than four layer packets, which can be removed sequentially in continuous sheet form, can be incorporated into the multilayered film if desired.

To facilitate the sequential removal of only one sheet (layer packet) at a time and ensure delamination occurs at interfaces between layer packets, the original multilayered polymer film (e.g. film 310), as well as the associated molded multilayer polymer film (e.g. film 311), can be made with kiss-cut tab-like features of differing depths near the edge of the film. These features provide access to the desired delamination surfaces, and are thus also referred to herein as access tabs. Some specific embodiments are discussed further below. Furthermore, published international application WO 2012/092478 (Wu et al.) exemplifies ways in which laser radiation can be used to cut and subdivide polymeric multilayer film bodies without any substantial delamination at the laser cut edge lines, which may be useful in forming the desired tab-like features. The laser radiation is selected to have a wavelength at which at least some of the materials of the film have substantial absorption so that the absorbed electromagnetic radiation can effectively vaporize or ablate the film body along the cut line. The laser radiation is also shaped with suitable focusing optics and controlled to suitable power levels to accomplish the vaporization along a narrow cut line. The laser radiation can be rapidly scanned across the workpiece according to pre-programmed instructions, and switched on and off rapidly so that cut lines of arbitrary shape can be followed. Alternatively, mechanical blades and other cutting devices can be used instead of laser radiation to form the tab-like features.

The disclosed molded multilayered polymer films may be tailored for a variety of purposes and for a variety of end-use applications. As mentioned above, a benefit of making the individual polymer layers and layer packets in a single coextrusion operation, rather than in separate manufacturing operations that involve handling, alignment, and lamination of separately manufactured films, is that the front major surfaces of the layer packets may be more easily maintained in a pristine and sterile state, until they are exposed by the peeling away of the layer packets in front of a given layer packet. The ability to refresh or renew those properties by successively peeling away individual layer packets, makes it particularly suitable for a hospital or clinic setting in which a sterile, substantially germ-free environment is desired. However, numerous other settings may also benefit from this product feature, including homes, schools, day care centers, offices, workplaces, kitchens, restaurants, food processing areas and equipment, and heavily used public areas and places such as airports, airplanes, trains, busses, and ships. Contoured surfaces of medical devices also can benefit by covering all or part of the surfaces with the disclosed peelable molded films. Examples include coverings for stethoscopes, blood pressure cuffs, equipment control screens and knobs, overhead lights in operating rooms, operating room tables, and the like. The touch screens on portable electronic devices such as mobile phones and smart phones are also particularly suitable workpieces for the disclosed films. Due to the peel-off nature of the layer packets or sheets, the disclosed films can also serve other purposes not directly related to germ-free applications, e.g., they may be useful for anti-graffiti purposes or for windshield protection for motor vehicles, aircraft, or watercraft. Other contoured surfaces that may become dirty, soiled, or otherwise tainted on a regular basis, and to which the disclosed peelable molded films can be applied, include light covers, walls, and other contoured surfaces in paint booths, face shields for medical and industrial applications, and baby changing stations.

Furthermore, even though the molded films can have contoured shapes that are self-supporting, they are typically not completely rigid but can be bent or flexed with minimal force, such as the force applied by a person's index finger or thumb while operating a keypad or while pressing a button of an electronic device. This characteristic of the molded films can be particularly useful in cases where they are applied to articles (workpieces) that have one or more push-buttons, touch-keys, and/or other components that have a moveable surface and that may form pan of a contour surface, such as a protuberance of a depression relative to a surrounding surface of the workpiece. In such cases, the contoured shape of the molded peelable film can mate with the push-button, touch-key, or other component, but the molded film can also flex to accommodate movement of such component so that a user can easily activate the button or key.

In some cases, it may be important for the disclosed molded multilayered polymer films, or their constituent components, to be highly transparent across the visible spectrum, such that the presence of the film is not visually apparent to users. Such a film may be applied to visually functional workpieces, such as mirrors, windows, or electronic displays, including touch screens. In such cases, the molded multilayered polymer film, and all of its constituent components including its layer packets and any adhesive backing layer that may be present (e.g. adhesive layer 404), may be substantially transparent, so that the workpiece to which it is applied does not change its appearance or its functionality regardless of how much of the original film is present on the workpiece at any given time, e.g., after one or more delaminations.

In other cases, the ability to see the workpiece through the molded film may not be important, or it may be undesirable. In such cases, the molded film, and one or more of its constituent polymer layers, may be opaque. The molded film or any of its layers may thus be tinted, dyed, pigmented, or otherwise configured to have an opaque or non-transparent characteristic. Printing (e.g. of inks or other materials) can be carried out on any exposed surface of the film or of the stack. Also, the molded film may be rendered opaque by including an additional opaque layer, e.g., positioned between an adhesive backing layer and the stack of polymer layers. This additional opaque layer may be coextruded with the stack as a "skin layer", or it may be laminated onto the stack after formation of the stack. Such an additional layer, whether coextruded as a skin layer or laminated after formation of the stack, may also be included to provide functionalities other than or in addition to opacity. Such functionalities may include antistatic properties or rigidity (when so desired), for example.

Both in cases where the film is transparent and in cases where the film is opaque, the disclosed molded films may be used to provide a controlled surface finish at the workpiece. For example, it may be desired to effectively provide the workpiece with a high quality smooth (low roughness) surface finish. Rather than polishing the surface of the workpiece itself, the molded film may be applied to the workpiece to provide the needed smooth surface, while also providing a contoured shape and contoured surface. In use, as the outer surface of the molded film becomes abraded or otherwise non-smooth, layer packets can be sequentially peeled away to restore the desired smooth surface after repeated abrasion events. In other cases, a controlled degree of roughness may be desired at the workpiece. In such cases, a controlled amount of suitably sized beads or other particles may be provided in the front-most polymer layer of each layer packet, so that the front-most (exposed) surface of the molded film has the desired amount of surface roughness. If the exposed surface should become worn down, abraded, contaminated with other materials, or the like, the desired surface roughness can be easily restored by simply peeling off the outermost layer packet to uncover the pristine surface of the immediately adjacent layer packet, which again has the desired surface roughness in addition to the contoured shape and contoured surface.

The reader will understand that the above applications are only exemplary, and that sterile films, anti-graffiti films, and controlled surface finish films are only some of a large number of possible applications of the disclosed molded multi-layered polymer films.

Figure 5:
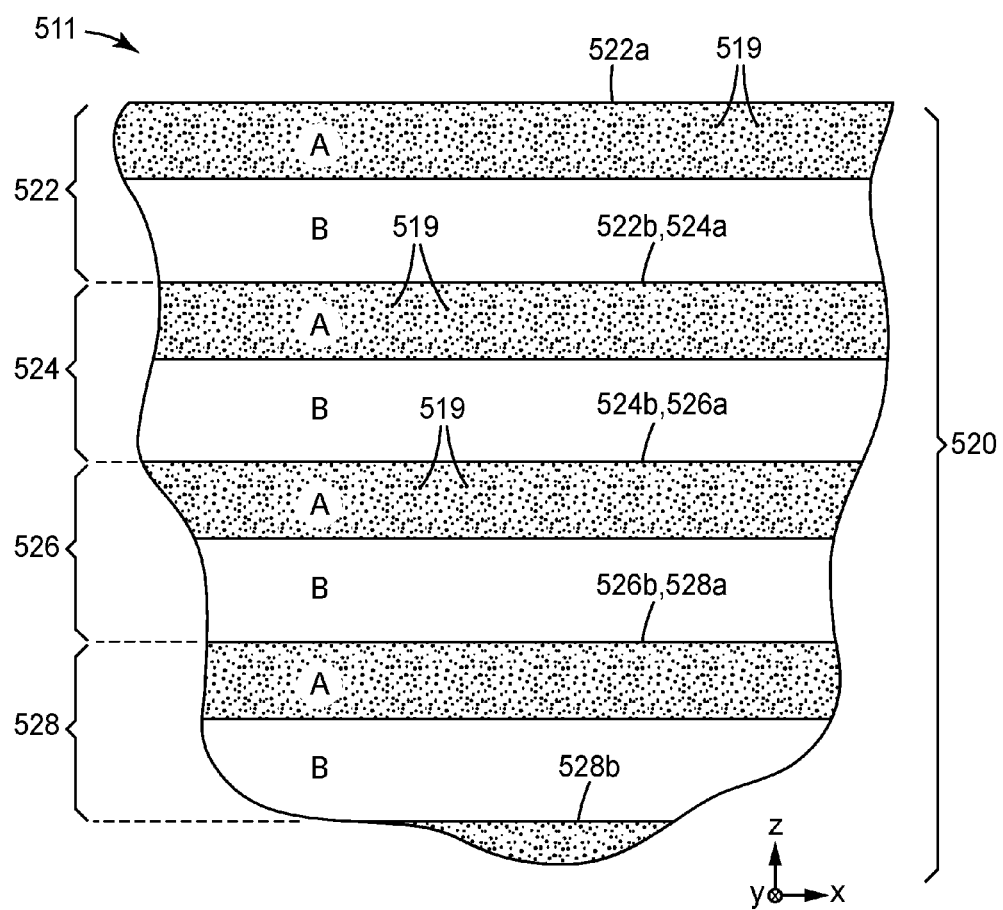
FIG. 5 is a schematic side or sectional view of a portion of a polymer film configured for successive irreversible delamination, the film being composed of a stack of polymer layers that are organized into 2-layer (A-B) layer packets.

Construction details of one possible molded film having the functionality discussed above in connection with FIGS. 1 through 4D are revealed in FIG. 5. In this figure, we see in schematic form individual polymer layers stacked together to form a stack 520 which may form all or part of a molded multilayered polymer film 511. In the depicted embodiment, the stack 520 is composed of only two types of polymer layers: polymer layers A, and polymer layers B, which are assumed to be composed of different polymer compositions A and B, respectively. These two different layer types are organized into repeating groups of layers A, B, A, B, and so forth, the smallest repeat unit (A, B) being referred to as a layer packet. The film 510 has at least four layer packets 522, 524, 526, and 528. Each of these layer packets is defined by a front major surface (see surfaces 522a, 524*, 526a, 528a) and a back major surface (see surfaces 522b, 524b, 526b, and 528b). The front and back major surfaces of adjacent layer packets are in intimate contact with each other. Each of the layer packets has exactly two polymer layers disposed between the front and back major surfaces: one polymer layer A, and one polymer layer B. As shown, the A layer of a given packet is the front-most polymer layer in the packet, and the B layer is the back-most polymer layer in the packet.

An optional additive 519 is also shown in some of the layers. If included in the film 511, the additive 519 may be or include, for example, one or more antimicrobial agent, suitably sized beads or other particles, and/or other desired additive(s). The additive 519 may be dispersed in the front-most layer A of each layer packet, but may not be present in any of the other polymer layers. In the figure, the additive 519 is shown schematically in the form of particles, but it may be present in a given polymer layer in any desired form, including as a particulate or as a continuous or co-continuous phase material. The additive 519 may also be soluble in one, some, or all of the layers of the layer stack, including e.g. the material of the polymer layers A.

In exemplary embodiments, neither of the polymer compositions A or B are pressure sensitive adhesives (PSAs), or other types of adhesives. An "adhesive" in this regard refers to a material or layer that, when or as applied to the surfaces of different components, binds the surfaces together and resists separation, and is tacky at room temperature. Furthermore, the polymer compositions A, B are preferably coextrudable with each other, such that the entire layer stack 520 can be (prior to molding to provide the desired contoured shape) coextruded in a single operation rather than being made in different operations and then later laminated together with an adhesive. The polymer compositions A, B are also preferably melt processable at melt temperatures (i.e., the temperatures of the molten polymers) of 204 degrees C. (400 degrees F.) or greater. In some cases, the original multilayered polymer film (before molding) may be made not only by coextrusion but also by one or more stretching or orienting step, such that the polymer layers A, and/or the polymer layers B, are oriented. Such oriented layers may have a minimum level of birefringence, e.g. a birefringence of at least 0.05. In this regard, a given material or material layer is said to be birefringent when it has a refractive index for light polarized along one direction that differs from a refractive index for light polarized along a different direction. The "birefringence" of the material or material layer is then the maximum difference between such refractive indices. Such maximum difference may occur in some cases between two orthogonal axes that both lie in the plane of the film (e.g. the x- and y-axes in FIGS. 5, 7, and 8), and in other cases between two orthogonal axes one of which lies in the plane of the film and the other of which is perpendicular to the plane of the film (e.g. the x- and z-axes in FIGS. 5, 7, and 8). The stretching, which is sometimes referred to as drawing, can be uniaxial or biaxial, and if biaxial, may be simultaneous or sequential. The act or process of stretching the multilayered film may result in all, or only some, or in some cases none of the constituent polymer layers being oriented, depending on the materials used and the process conditions such as the temperature of the film during stretch. Reference is made to U.S. Pat. No. 6,179,948 (Merrill et al.) for further discussion of known stretching or drawing techniques. For example, a two-step drawing process can be carried out in which one set of layers (e.g. the polymer layers A) substantially orients during both drawing steps, while the other set of layers (e.g. polymer layers B) only substantially orients during one drawing step. The result is a multilayered film having one set of material layers that are substantially biaxially oriented after drawing, and having another set of material layers that are substantially uniaxially oriented after drawing. Any birefringence in the original multilayered polymer film (before molding) may be substantially maintained in the corresponding layers of the molded multilayered polymer film.

The polymer compositions A and B may be polyester-based materials, but other suitable materials can also be used. For example, the A composition may be or comprise polyesters, polyolefins, poly-alpha-olefins, polymethacrylates, polycarbonates, polycarbonate alloys, polyurethanes, aliphatic polyesters such as polylactic acid, polyhydroxybutyrate, polyhydroxysuccinate, and the like, styrenic copolymers, silicones, or copolymers and/or blends thereof, and the B composition may for example be or comprise polyesters, polyolefins, poly-alpha-olefins, polymethacrylates, polycarbonates, polycarbonate alloys, aliphatic polyesters such as polyhydroxybutyrate, polyethylene succinate, polylactic acids, and the like, styrenic copolymers, silicones, or copolymers and/or blends thereof, with the understanding that the A and B compositions are different. Copolymers may be block or random or a combination thereof.

In some cases it may be desirable for the layer stack 520 to be ethylene oxide sterilization compatible. Ethylene oxide possesses the ability to penetrate paper, a number of plastics, and rubber. It is currently used to sterilize disposable syringes, hypodermic needles, prepackaged material, petri dishes, pipettes, etc. Advantages of ethylene oxide sterilization may include: it is suitable for thermolabile substances, because it can be carried out at, or only slightly above, room temperature; it does not damage moisture-sensitive substances and equipment because only a low humidity is required; it can be used for prepackaged articles, because of the great penetrating capability of ethylene oxide; and though ethylene oxide is a highly reactive compound, comparatively few materials are damaged by this process. Disadvantages of ethylene oxide sterilization may include: during sterilization, ethylene-oxide can be strongly adsorbed by some substances; and ethylene oxide can produce toxic substances, such as ethylene chlorohydrin, in some materials.

In certain embodiments it may be desirable to sterilize the film by ionizing radiation such as gamma radiation or electron beam. In such cases, the material compositions of the film are chosen to withstand this treatment. One or more antioxidants such as hindered phenols, phosphites, and hindered amines may need to be added in order to ensure polymer stability.

The stack 520 is preferably configured to promote irreversible delamination at interfaces between layer packets, e.g., at major surfaces 524a/522b, 526a/524b, and so forth, rather than at interfaces within any of the layer packets. In the simple AB stack, every interface in the stack is between a polymer layer A and a polymer layer B; hence, although the layer-to-layer peel strength can be tailored by appropriate selection of the polymer A and B compositions, the peel strength at every interface will be substantially the same. The stack can nevertheless be configured in other ways to promote delamination at the desired interfaces. The stack may for example be provided with physical structures that promote the delamination.

Figure 6A:
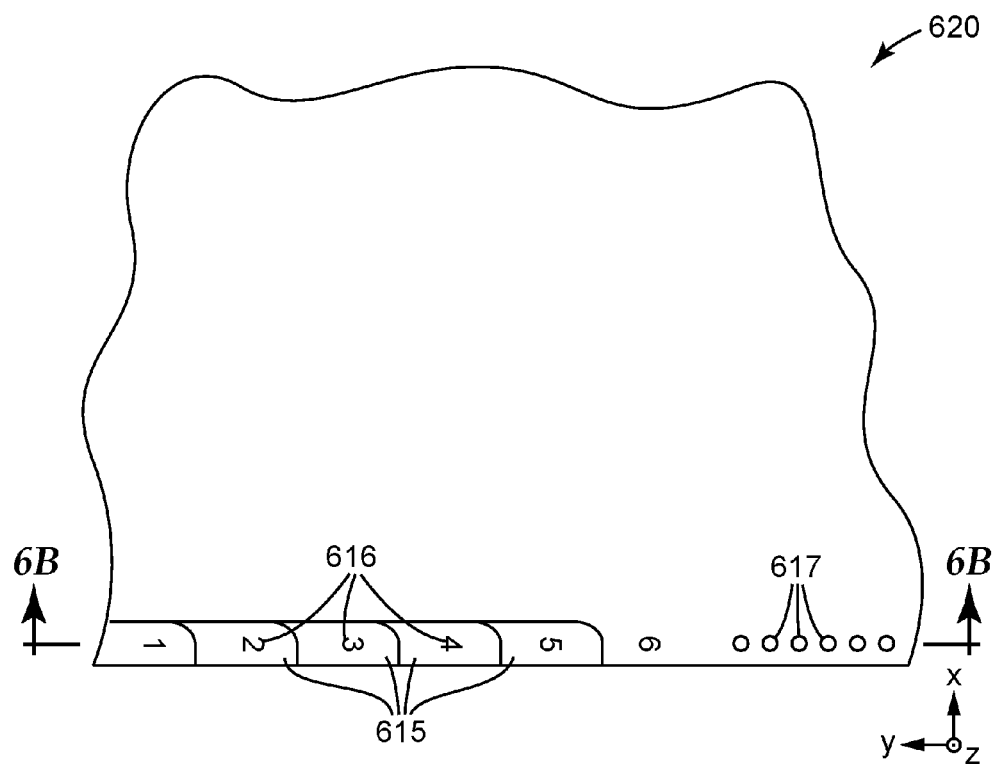
FIG. 6A is a schematic top or front plan view of a stack of coextruded polymer layers that is provided with physical structures including structures to promote delamination between layer packets.
Figure 6B:
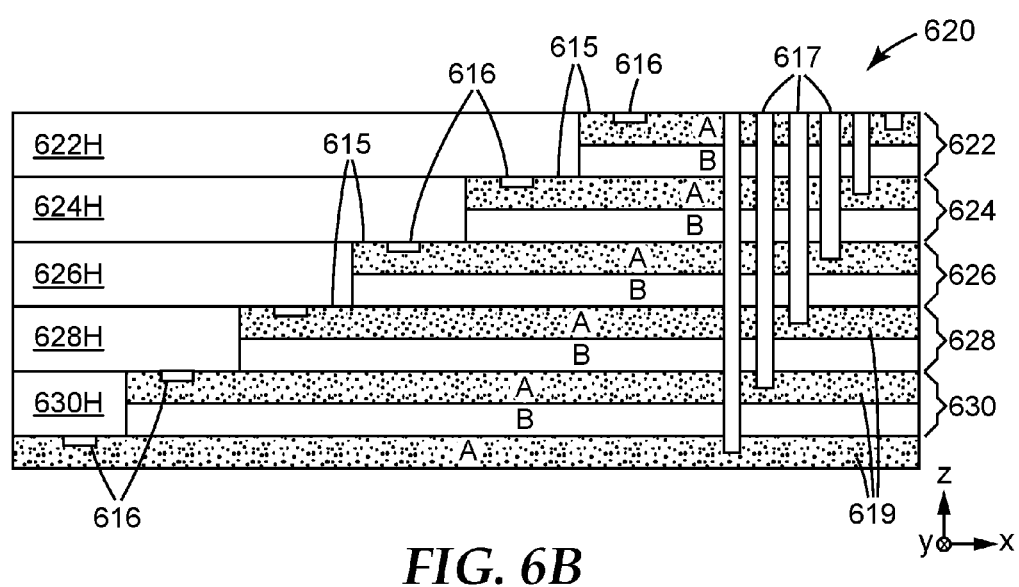
FIG. 6B is a schematic cross-sectional view along cut line 6B-6B.

An example of such physical structures is shown in the layer stack of FIGS. 6A and 6B. The layer stack shown in these figures is assumed to be part of a molded multilayered polymer film as discussed herein. A stack 620 of coextruded polymer layers, which may be the same as or similar to the stack 520, is shown in schematic plan view in FIG. 6A and in schematic cross-sectional view, along cut line 6B-6B, in FIG. 6B. The stack 620 has a repeating AB polymer layer construction, with pairs of adjacent layers forming AB-type layer packets 622, 624, 626, 628, 630. The polymer layers A may comprise an optional additive 619 dispersed therein, and the polymer layers B may or may not include such additive. A nested set of kiss-cut holes 622H, 624H, 626H, 628H, 630H are formed by mechanical blades, laser radiation, or any other suitable means to define access tabs 615. The kiss-cut holes and the tabs provide a stair-step-like cross sectional profile as shown in FIG. 6B. The depths of the kiss-cut holes are tailored so that the interfaces between adjacent layer packets are accessible to the user via the tabs 615. For example, a user may slide a fingernail or other sharp object along one tab towards another tab to pry the entire uppermost layer packet (which in the case of FIGS. 6A and 6B is layer packet 622) away from the remainder of the stack 620, thus exposing the polymer layer A of layer packet 624 to the environment.

Similarly, the entire molded film depicted in FIG. 6B, neglecting the bottom-most "A" layer, may be employed in an inverted orientation to that shown in the figure. In the inverted orientation, the layer packet 630 (with its associated hole 630I) would be the uppermost or outermost layer packet in the stack, the layer packet 622 (with its associated hole 622I) would be the bottom-most or innermost layer packet in the stack (closest to the workpiece), and the polymer "A" layers and "B" layers throughout the film (except for the omitted "A" layer) would be interchanged relative to that shown in the figure such that the layers labeled "A" in FIG. 6B would be composed of polymer B and would contain no additive, and the layers labeled "B" in FIG. 6B would be composed of polymer A and would contain the additive 619. In this orientation, rather than sliding a fingernail or other sharp object along one tab to pry the entire layer packet 622 away from the remainder of the stack, the user would grasp the tab 615 of the layer packet 630 e.g. between two fingertips and pull the tab to peel the layer packet 630 away from the remainder of the stack, in order to expose the "A" layer of the next layer packet (layer packet 628) to the environment.

Labels, indicia, or other markings or features can also be provided on or in one or more layers of the stack 620. In the depicted layer stack 620, there are two types of such markings. Markings 616 are shallow holes or depressions formed in each of the polymer layers A in the regions of the access tabs 615. The markings 616 may be shaped in plan view in the form of alphanumeric characters or other symbols. In the depicted embodiment, the markings 616 are numbers that can be observed by the user as a convenient indication of how many peelable sheets remain in the stack, and on the workpiece. For example, upon delamination and removal of the front-most layer packet 622, the marking 616 in the form of a "6" will be removed along with the packet 622, so that only the markings 616 in the form of "1", "2", "3". "4", and "5" will remain visible to the user. The markings 616 are shown as shallow holes or depressions in the polymer layers A, but they may utilize alternative designs. For example, the markings 616 may simply be alphanumeric characters or other symbols printed with ink onto the same regions of the access tabs 615.

Another type of marking shown in FIGS. 6A and 6B are the markings 617. These markings are holes of different depth through the stack 620. These holes may all open at the exposed surface of the front-most layer and terminate at different layer packets: the shallowest hole terminates in the front-most layer packet 622, the next deepest hole terminates in the next layer packet 624, the next deepest hole terminates in the next layer packet 626, and so forth. These holes are shown as simple round holes and are non-overlapping and spaced apart from each other along a straight line near an edge of the stack 620, but other designs can also be used. For example, the holes may have more complex outlines in plan view, e.g., in the form of alphanumeric characters. The markings 617 can also provide an indication to the user of how many peelable sheets or layer packets remain in the stack and on the workpiece. For example, six of the markings 617 are visible in the plan view of FIG. 6A, but after the outermost layer packet 622 is peeled away, only five of the markings 617 will remain, and after the layer packet 624 is peeled away, only four of the markings 617 will remain, and so forth.

Numerous alternative embodiments to that of FIGS. 6A and 6B can also be made. For example, the markings 616 may be omitted while retaining the markings 617, or the markings 617 may be omitted while retaining the markings 616, or both markings 616 and 617 may be omitted. Furthermore, holes 622H, 624H, etc. and access tabs 615 may also be omitted. If desired, the various layers can be made to have different colors by incorporating dyes, pigments, or other tinting or coloring agents, such that, for example, every other layer packet (or one or more layers thereof) is a different color, or the last layer packet or last few layer packets in the stack may be colored with such dyes, pigments, etc. to provide a visible indication to the user that no more layer packets (or only one or a few layer packets) are available for delamination.

The layer packets of FIG. 5 are 2-layer (A-B) packets. The reader will understand, however, that other layer types, e.g., polymer layers C, D, E, and so forth, may be added to the stack, such that the layer packets of the modified layer stack contain more than 2 individual polymer layers. Preferably, the additional polymer layers are added in such a way that the modified stack remains free of adhesive or PSA, and that the modified stack can be made by a single coextruding process, and that sheets or layer packets can be successively irreversibly delaminated from the remainder of the layer stack of the molded multilayered polymer film. One benefit of designing the layer packets to include more than 2 polymer layers is it allows for a variety of different layer-to-layer attachment strengths by appropriate selection of the polymer materials A, B. C, etc. This in turn allows us to select the A, B, C, etc. materials such that the weakest layer-to-layer attachment occurs at interfaces between layer packets, rather than at interfaces between layers within one or more of the layer packets. Such an arrangement can be used to configure the layer stack to promote irreversible delamination between layer packets rather than within the layer packets. Then, if desired, by ensuring that the front-most polymer layer of each layer packet includes an effective amount of a desired additive, peeling away one layer packet from the stack will result in a fresh additive-loaded layer of the underlying layer packet being the new front surface of the film.

Figure 7:
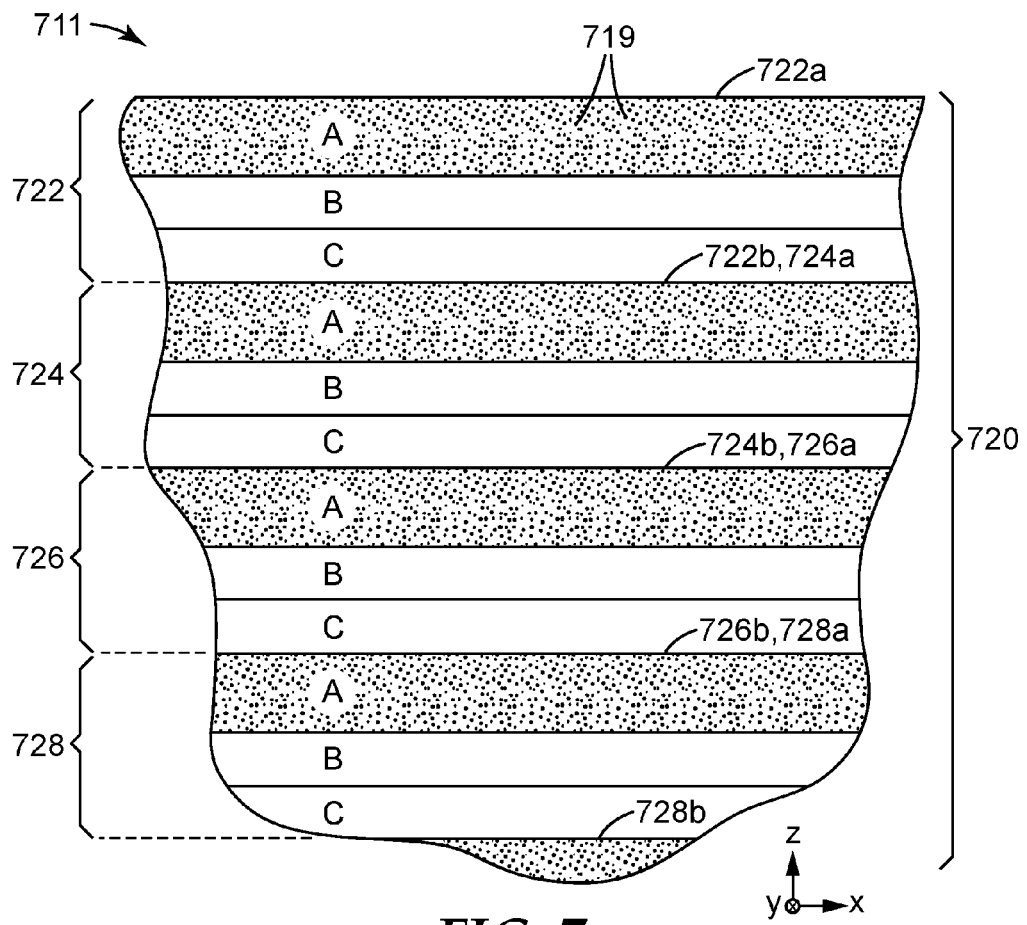
FIG. 7 is a schematic side or sectional view of a portion of a polymer film configured for successive irreversible delamination, the film being composed of a stack of polymer layers that are organized into 3-layer (A-B-C) layer packets.
Figure 8:
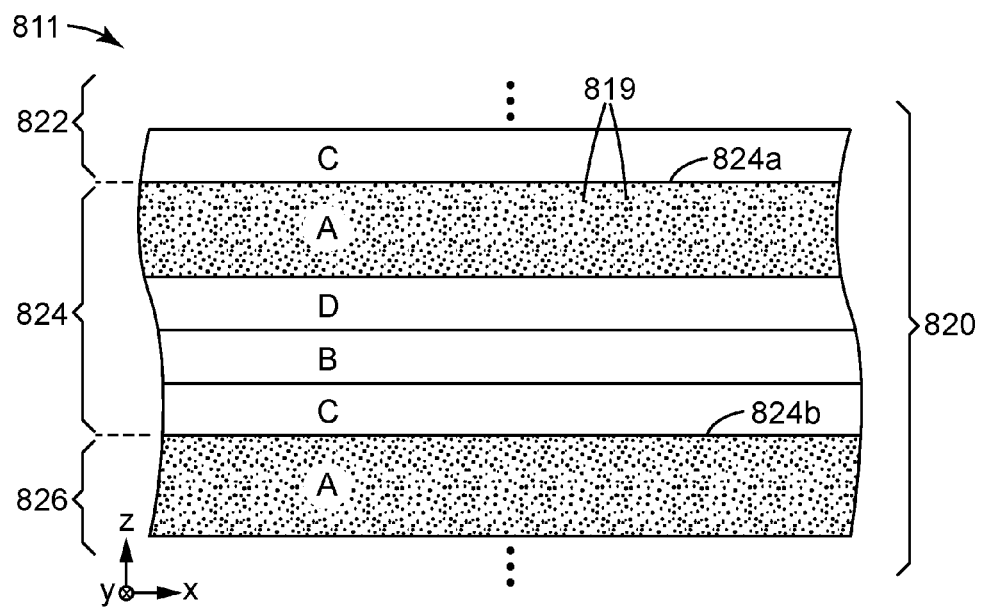
FIG. 8 is a schematic side or sectional view of a portion of a polymer film configured for successive irreversible delamination, the polymer layers in the stack being organized into 4-layer (A-D-B-C) layer packets.

Construction details of another possible molded film having the functionality shown in FIGS. 4A-4D are revealed in FIG. 7. In this figure, we see in schematic form individual polymer layers stacked together to form a stack 720 which may form all or part of a molded multilayered polymer film 711. The stack 720 may be similar to stack 520, e.g. insofar as: the polymer layers of stack 720 may be made by a single coextrusion operation, and optionally one or more stretching or orienting step; the stack 720 may contain no adhesive layers and no pressure sensitive adhesive layers; the stack 720 may include some polymer layers that have an effective amount of a desired additive 719, including at least one such layer interior to the stack, and some polymer layers that do not; the stack 720 may be configured to promote delamination between layer packets rather than along interfaces within the layer packets; and the polymer compositions of the stack 720 may be melt processable at melt temperatures of 204 degrees C. (400 degrees F.) or greater. The stack 720 however differs from stack 520 because it is composed of more than two (three) types of polymer layers: polymer layers A, polymer layers B, and polymer layers C, which are assumed to be composed of different polymer compositions A, B, and C respectively. These three different layer types are organized into repeating groups of layers A, B, C, A, B, C, and so forth, the smallest repeat unit (A, B, C) being referred to as a layer packet. The film 711 has at least four layer packets 722, 724, 726, and 728. Each of these layer packets is defined by a front major surface (see surfaces 722a, 724a, 726, 728a) and a back major surface (see surfaces 722b, 724b, 726b, and 728b). The front and back major surfaces of adjacent layer packets are in intimate contact with each other. Each of the layer packets has exactly three polymer layers disposed between the front and back major surfaces: one polymer layer A, one polymer layer B, and one polymer layer C. As shown, the A layer of a given packet is the front-most polymer layer in the packet, and the C layer is the back-most polymer layer in the packet, and the B layer is an interior layer (neither front-most nor back-most) in the given packet. The stack 720 is configured such that the polymer layers A contain an effective amount of an optional additive 719, while the other polymer layers (B and C) do not. In alternative embodiments, all of the layers (A, B, and C) may contain the optional additive.

The polymer compositions B and either A or C may be polyester-based materials. In this regard, we have developed polyester and non-polyester-based material combinations which, when incorporated properly into layers B, or A or C, respectively, in the stack 720, can cause the layer packets 722, 724, etc. to preferentially delaminate along delamination surfaces corresponding to the interfaces between adjacent layer packets (refer to the dashed lines in FIG. 7). With respect to the 3-constituent layer embodiment of FIG. 7, we have found that we can make the delamination surfaces coincide with the interfaces between the polymer C layers and the polymer A layers by making the attachment of the C layers to the A layers substantially weaker than the attachment of the C layers to the B layers, and weaker than the attachment of the B layers to the A layers. This in turn can be achieved by using a blend of polypropylene copolymer with a suitable amount of another resin for the polymer composition C. For example, polymer composition C may be a miscible blend of propylene copolymer and styrenic block copolymer, or a miscible blend of propylene copolymer and an ethylene alpha olefin copolymer, or a miscible blend of propylene copolymer and an olefin block copolymer. In cases where the polymer composition C is a miscible blend of propylene copolymer and styrenic block copolymer, the polymer composition B may be an immiscible blend of copolyester and an olefin, or the polymer composition B may be an amorphous copolyester and the polymer composition A may be a semi-crystalline polyester. In some cases, the polymer composition C may be at least partially miscible with the polymer composition B, and the polymer composition B may be at least partially miscible with the polymer composition A, but the polymer composition C may not be miscible with the polymer composition A. In this regard, a given polymer composition which is an immiscible blend of polymers, such as any of polymer compositions A, B, or C, may be said to be at least partially miscible with another polymer composition if at least one component of the immiscible blend is miscible with the another polymer composition (or with at least one component of the another polymer composition if the another polymer composition is also an immiscible blend or a block copolymer, in which case "component" refers to the individual block domains of the block copolymer). As already indicated above, even though attachment between the polymer A layers and the polymer C layers may be weakest, such attachment may still be greater than zero, e.g., the peel force at the A/C interfaces may be at least 1 gram/inch, or at least 2 grams/inch.

For the purposes of the present disclosure, the terms "miscible", "miscibility", and the like, are not meant in the absolute sense of requiring that the two or more polymers in question form one homogeneous phase of spatially-constant composition, but rather, in the relative sense that there be sufficient inter-diffusion of the two or more polymers to provide significant interactions of entanglements across the interface between phases, and/or what is sometimes referred to in the literature as an "interphase" between the layers. Miscibility in this relative sense is also sometimes referred to in the polymer science literature as "compatibility" or "partial miscibility". Further, a homopolymer or random copolymer, for instance, may be said to exhibit miscibility in this sense with a block copolymer if it has such ability to interact with the domains of just one block of the block copolymer, even if the homopolymer or copolymer is entirely immiscible with the domains of the other block(s) of the block copolymer.

Differences in degrees of miscibility among the A-B, B-C, and A-C pairs of layers is not the only way to influence the relative values of peel force among the pairs of layers. For example, the at least partial miscibility of at least one component of layer A with at least one component of layer B will tend to increase the peel force of the A-B pair, due to the increase in intermolecular entanglement across the interface between these two layers. Alternatively, the presence of macromolecular orientation, or crystallinity, or both, in at least one component of at least one of layers A and B may tend to decrease the peel force of the A-B pair. This would be due to a decrease in intermolecular entanglement across the interface between the two layers which can be caused by the decreased mobility of polymer molecules which are molecularly oriented (rather than in random coil configuration), involved in structured crystallites (rather than being in an amorphous state), or both. One or more uniaxial or biaxial stretching step(s) in the film-making process can lead to molecular orientation, crystallization, or both. Thus, for layers composed at least in part of a polymer which tends to orient, crystallize, or both, under stretching, film stretching can be an alternative or a complement to altering the composition of the layers as a means of affecting the relative values of peel force among the pairs of layers. In other words, morphology (such as degree of crystallinity), as well as composition, can be used to affect the relative peel force among pairs of layers.

Thus, by designing the stack 720 so that the attachment between layer packets is weaker than attachment between layers within the layer packets, the stack 720 may thus be configured to promote delamination at the desired interfaces. However, in addition or in the alternative, the stack 720 may also be configured to promote delamination at the desired interfaces by providing the stack 720 with physical structures that promote the delamination, including in particular the access tabs and/or any of the other features discussed in connection with FIGS. 6A and/or 6B.

The layer packets of FIG. 7 are 3-layer (A-B-C) layer packets. The reader will understand, however, that the A, B, C layers may be organized differently, and/or other layer types (e.g. polymer layers D, E, and so forth) may be added to the stack, such that the layer packets contain more than 3 individual polymer layers. For example, the A, B, C layers may be arranged in an A, B, A, B, C, A, B, A, B, C, etc. arrangement, such that each layer packet is a 5-layer group (A-B-A-B-C) of polymer layers. In this case the attachment of the C layers to the A layers is again made to be substantially weaker than the attachment of the C layers to the B layers, and weaker than the attachment of the B layers to the A layers, so that delamination surfaces are formed at interfaces between the C layers and the A layers. The weak attachment of the A layers to the C layers may be greater than zero, e.g., the peel force may be at least 1 gram/inch, or at least 2 grams/inch. In this embodiment, all of the polymer layers A may be provided with one or more optional additives, while the polymer B and C layers may or may not. Alternatively, the optional additive(s) may be provided in only some of the polymer layers A, e.g., only the polymer layers A that are the front-most polymer layer of each layer packet, and in none of the remaining A layers and in none of the B or C layers.

In a given peelable molded film, designated layers (e.g. the polymer A layers) in the various layer packets (whether AB, or ABC, or otherwise) may contain the same additive, or different additives. In a simple case, designated layers within the film may all contain the same additive. In alternative embodiments, at least two polymer layers within different layer packets of the film may contain different additives, and in some cases each polymer layer within the film may contain a distinct additive, i.e., each polymer layer may contain an additive that is not contained in any of the other polymer layers.

In another example, polymer layers D, assumed to be made of a polymer composition D different than compositions A, B, and C, may be added to the layer stack. Such an embodiment is shown schematically in FIG. 8. In the figure, a molded multilayered polymer film 811, only a portion of which is shown, contains a polymer layer stack 820. The layer stack 820 is made up of four different types of polymer layers: polymer layers A, B, C, and D, composed of different polymer compositions A, B, C, and D, respectively. None of the compositions A, B, C, D are pressure sensitive adhesives (PSAs), or other types of adhesives, and these polymer compositions are preferably coextrudable with each other, such that the entire layer stack 820 can be coextruded in a single operation. The polymer compositions A, B, C, D are also preferably melt processable at melt temperatures of 204 degrees C. (400 degrees F.) or greater. Any or all of the polymer layers A, B, C, and/or D may also be oriented, and may have a birefringence of at least 0.05. The stack 820 is configured such that the polymer layers A contain an effective amount of an optional additive 819, while the other polymer layers (B, C, and D) do not.

The polymer layers are organized in a repeating sequence A, D, B, C, A, D, B, C, etc., and the polymer compositions are tuned so that attachment of the C layers to the A layers is weaker than the attachment of any other adjacent layer pairs in the stack 820, analogous to the embodiment of FIG. 7. In this way, the polymer layers are organized into 4-layer layer (A-D-B-C) layer packets, and delamination preferentially occurs along delamination surfaces corresponding to the interfaces between adjacent layer packets (refer to the dashed lines in FIG. 8), i.e., to the interfaces between the polymer C layers and the polymer A layers.

Thus, by designing the stack 820 so that the attachment between layer packets is weaker than attachment between layers within the layer packets, the stack 820 may thus be configured to promote delamination at the desired interfaces. However, in addition or in the alternative, the stack 820 may also be configured to promote delamination at the desired interfaces by providing the stack 820 with physical structures that promote the delamination, including in particular the access tabs and/or any of the other features discussed in connection with FIGS. 6A and/or 6B.

Figure 9:
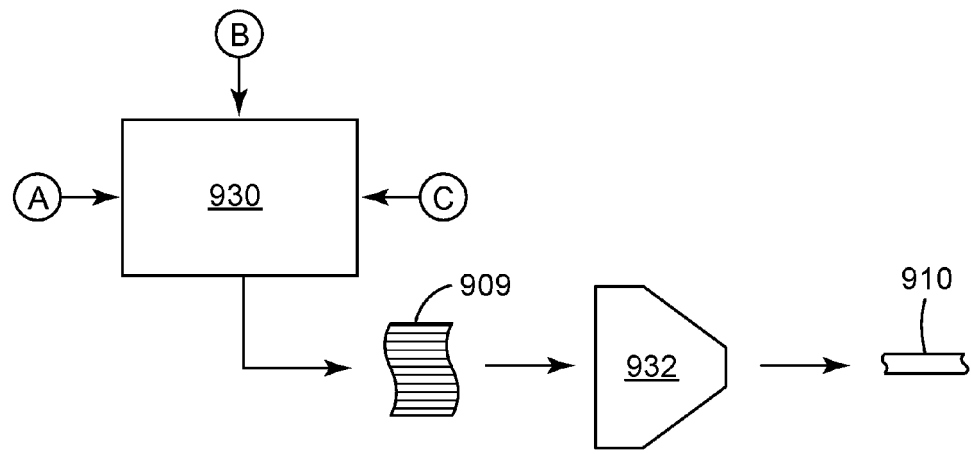
FIG. 9 is a schematic representation of a manufacturing system in which different polymer materials are coextruded to form a multilayered polymer film.
Figure 10:
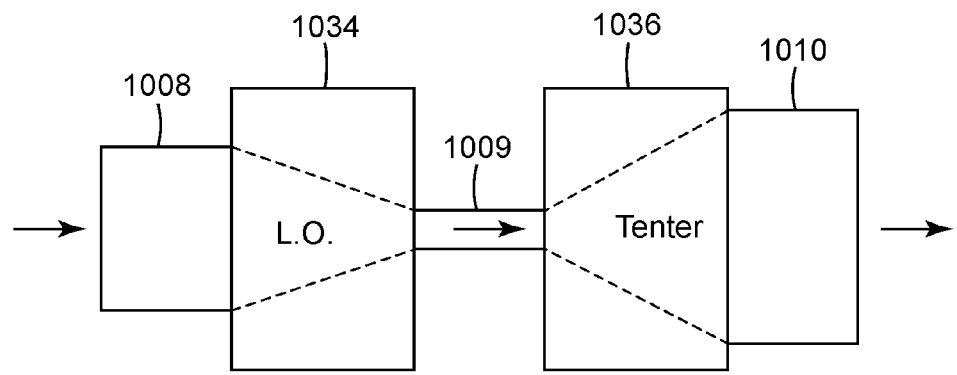
FIG. 10 is a schematic representation of film processing equipment that can be used to stretch a cast multilayered polymer film.

FIGS. 9 and 10 are schematic representations of manufacturing systems that can be used in the manufacture of the disclosed multilayered polymer films. FIG. 9 schematically depicts the coextrusion of three polymer compositions A, B, C as described elsewhere herein to form a multilayered polymer film 910. In alternative embodiments, only two polymer compositions (e.g., A, B) may be used, while in other embodiments more than three polymer compositions (e.g., A, B, C, D) may be used. The compositions can be fed via twin-screw extruders or other suitable means to a feedblock 930 that interleaves the molten polymer flow paths so that they form a multilayered extrudate 909. In cases where three polymer compositions are used, the A, B, and C polymer layers may be arranged in the extrudate 909 in the repeating pattern desired in the finished film. In some cases, the extrudate 909 may be fed into one or more layer multiplier units to form an output extrudate having a multiple (e.g., 2×, 3×, or 4×) of the number of layers in the original extrudate 909. Whether or not layer multipliers are used, the multilayered extrudate can then be fed into a film die 932, the output of which can be quenched on a casting wheel to form a cast multilayered polymer film. In some cases, the cast film may, with no additional components or features, become the multilayered polymer film 910, to which a self-supporting contoured shape is then imparted in a later post-forming or molding operation. In some cases, additional layers and coatings may be applied to the cast film for additional functionality. For example, a release liner may be applied to one or both exposed major surfaces of the cast film. Also, an adhesive backing layer may be coated onto one of the exposed major surfaces of the cast film so that it can be readily applied to workpieces of interest. Physical structures, including in particular access tabs and/or other features discussed herein, may also be provided. Regardless of how many additional layers and coatings are applied, the multilayered polymer film 910 includes the stack of polymer layers formed by coextrusion using the feedblock 930, optional layer multiplier(s), and die 932. The layers in the stack may be organized into layer packets tailored to irreversibly delaminate from each other as discussed elsewhere herein, even after the film 910 is post-formed or molded.

In some cases, it may be desirable to stretch or orient the multilayered cast film, whether to impart a birefringence to some or all of the individual layers in the film, or to change other material properties of some or all of the individual polymer layers. Such stretching or orientation is depicted schematically in FIG. 10. A multilayered cast film 1008, which may be the same as or similar to the cast film 910 of FIG. 9, and which includes at least two, three, or more different polymer layer types arranged in the repeating pattern desired in the finished film, may be fed into one or more known film-handling devices that stretch the film in the down-web direction and/or in the cross-web direction, whether sequentially, simultaneously, or a combination thereof, to provide an oriented multilayered polymer film 1010 with the delamination characteristics described herein. In FIG. 10, the multilayered cast film 1008 is shown being fed first into a length orienter (L.O.) 1034, which stretches the film in the down-web direction to provide a preliminary oriented film 1009, followed by a tenter 1036, which stretches the film in the cross-web direction, to yield the oriented multilayered polymer film 1010 which is later post-formed. In alternative embodiments, the length orienter 1034 may be omitted, or the tenter 1036 may be omitted, or additional length orienter(s) and/or tenter(s) may be added. A tenter designed to be capable of stretching the film in both the downweb and crossweb directions simultaneously (not shown) may also be used, either alone or in combination with the aforementioned stretching devices. Specially designed tenters such as so-called parabolic tenters may also be used, alone or in combination with other stretching units. See for example U.S. Pat. No. 7,104,776 (Merrill et al.), U.S. Pat. No. 7,153,122 (Jackson et al.), and U.S. Pat. No. 7,153,123 (Jackson et al.). In other embodiments (not shown), the cast film may be formed into a tubular rather than flat-film configuration, and the tubular cast film may then be stretched using blown film processes or the like. The methods that can be used for stretching/orienting the cast film into a stretched film are not limited.

Similar to the discussion above in connection with FIG. 9, the oriented film 1010 may, with no additional components or features, become (after a suitable post-forming or molding operation as discussed herein) the molded multilayered polymer film whose delamination properties are discussed herein. In other cases, additional layers and coatings, such as release liner(s) and adhesive backing layer(s), may be applied to the oriented film for additional functionality. Physical structures, including in particular access tabs and/or other features discussed herein, may also be provided. Regardless of how many additional layers and coatings are applied, the multilayered polymer film includes the stack of polymer layers formed originally by coextrusion, and then optionally oriented by stretching, the layers in the stack being organized into layer packets tailored to irreversibly delaminate from each other as discussed elsewhere herein.

As a result of the polymer layers in the layer stack being preferably compatible with simultaneous formation by coextrusion, as depicted in FIG. 9, the individually peelable layer packets can be made thinner than if they were manufactured separately and then laminated to each other. Preferably, each of the layer packets in the stack may have a thickness of no more than about 2 mils (about 50 microns). Furthermore, the layer stack may contain a total of N layer packets, and N may be at least 5 or at least 10, and the film may have an overall thickness of no more than about 15 or 20 mils (about 380 or 510 microns respectively). At least N−1 of the layer packets may have a same number M of the polymer layers, and M may be at least 2, or at least 3. The M polymer layers may be arranged in a sequence that is the same for the N−1 layer packets or for all N layer packets.

Of some importance to the ability of some of the disclosed films to preferentially delaminate at a particular type of interface that repeats throughout a stack of polymer layers is the appropriate selection of the polymer compositions of the various layer types within the stack. For such films, we may assume that the stack includes individual polymer layers organized into layer packets, each layer packet having a front-most polymer layer, a back-most polymer layer, and at least one interior polymer layer. We may further assume that the layer stack is tailored to preferentially delaminate at delamination surfaces corresponding to interfaces between the front-most layer and back-most layer of adjacent layer packets. In such cases, generally, suitable compositions for the front-most layer can be selected from polyester, copolyesters, acrylics, and silicone thermoplastics. Furthermore, suitable compositions for the back-most layer can be selected from blends of olefins such as polypropylene or polyethylene blended with suitable amounts of a styrenic block copolymer, or an ethylene alpha olefin copolymer, or an olefin block copolymer. Still further, suitable compositions for the interior polymer layer can be selected from a variety of polymers and polymer blends, including but not limited to copolyesters, PMMA, co-PMMA, styrenic block copolymers, polypropylene, and silicone polyoxamides. Note that not all combinations of the aforementioned suitable compositions for the different layer types will yield the desired results, and judgment should be used to identify appropriate combinations of the polymer materials for use in the different layer types to achieve the desired functionality and delamination characteristics. For example, the front-most layer may be or comprise a semi-crystalline polyester, the back-most layer may be or comprise a polypropylene blended with a styrenic block copolymer, an ethylene alpha olefin copolymer, or an olefin block copolymer, and the interior layer may be or comprise a copolyester. In another example, the front-most layer may be or comprise polymethylmethacrylate (PMMA) or co-PMMA, the back-most layer may be or comprise a blend of polypropylene and a styrenic block copolymer, and the interior layer may be a blend of PMMA or co-PMMA with a styrenic block copolymer or polypropylene. In still another example, the front-most layer may be or comprise a silicone polyoxamide, the back-most layer may be or comprise polypropylene and a styrenic block copolymer, and the interior layer may be a styrenic block copolymer.

In one approach to tailoring the attachment strength of one polymer layer to other polymer layers in the layer stack, a polymer composition composed of a blend of polypropylene and one of several copolymer resins exhibits an attachment strength to other polypropylene layers that is a function of the proportion of the blended ingredients. This approach is discussed in more detail in U.S. patent application Ser. No. 13/596,425, "Coextruded Polymer Film Configured For Successive Irreversible Delamination", filed on Aug. 28, 2012).

Figure 11:
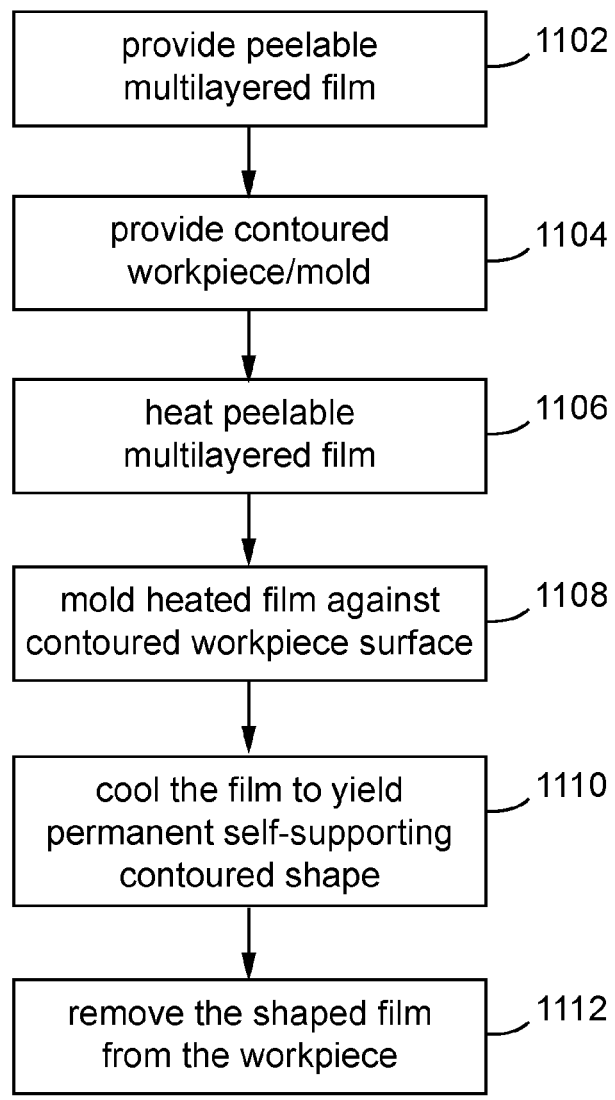
FIG. 11 is a flow diagram showing one technique for producing the disclosed molded multilayered polymer films.

The flow chart of FIG. 11 is provided to summarize a technique for carrying out the post-forming or molding operation to produce the disclosed molded, peelable multi-layered polymer films. In box 1102, a multilayered polymer film is provided. This film may be made by layered coextrusion of suitable polymer materials as discussed in connection with FIGS. 9 and 10, and the film may include a stack of polymer layers organized into layer packets tailored to irreversibly delaminate from each other as discussed elsewhere herein. In box 1104, a contoured workpiece is also provided. This workpiece may be a mold, or an article that can be used as a mold. The workpiece has a contoured surface whose shape is desired to impart to the finished molded, peelable film. In box 1106, the multilayered polymer film from box 1102 is heated. As mentioned above, the heating may soften at least some of the constituent layers of the multilayered polymer film, e.g., it may heat the film above at least one glass transition temperature associated with the stack of polymer layers. Also, in some cases, the heating may be provided in whole or in part as a byproduct of the manufacturing process of the multilayered polymer film of box 1102. The film may also or alternatively be heated by heating the workpiece/mold, and then supplying heat to the film through the workpiece/mold. In box 1108, the multilayered polymer film is post-formed (e.g. thermoformed) or molded against the contoured surface of the workpiece/mold. Typically, pressure is applied to the film during this process, e.g., differential air pressure with the use of a vacuum, or direct pressure applied by one or more mechanical elements, so that the film conforms to the relevant contoured surface of the workpiece/mold. Note that the heating of box 1106 may occur simultaneously with, or as part of, the molding of box 1108. The heating and molding of boxes 1106, 1108 are preferably carried out so that the layer structure and the irreversible delamination characteristic of the multilayered polymer film of box 1102 is substantially preserved. In box 1110, the (now molded) film is cooled so that the contoured shape that was acquired from the workpiece/mold is retained in the film. The cooled, molded multilayered polymer film embodies the contoured shape and is self-supporting. Also, its layer packets can be sequentially irreversibly delaminated from the remainder of the molded film. In box 1112, the shaped or molded film is removed from the workpiece/mold.

Figure 12:
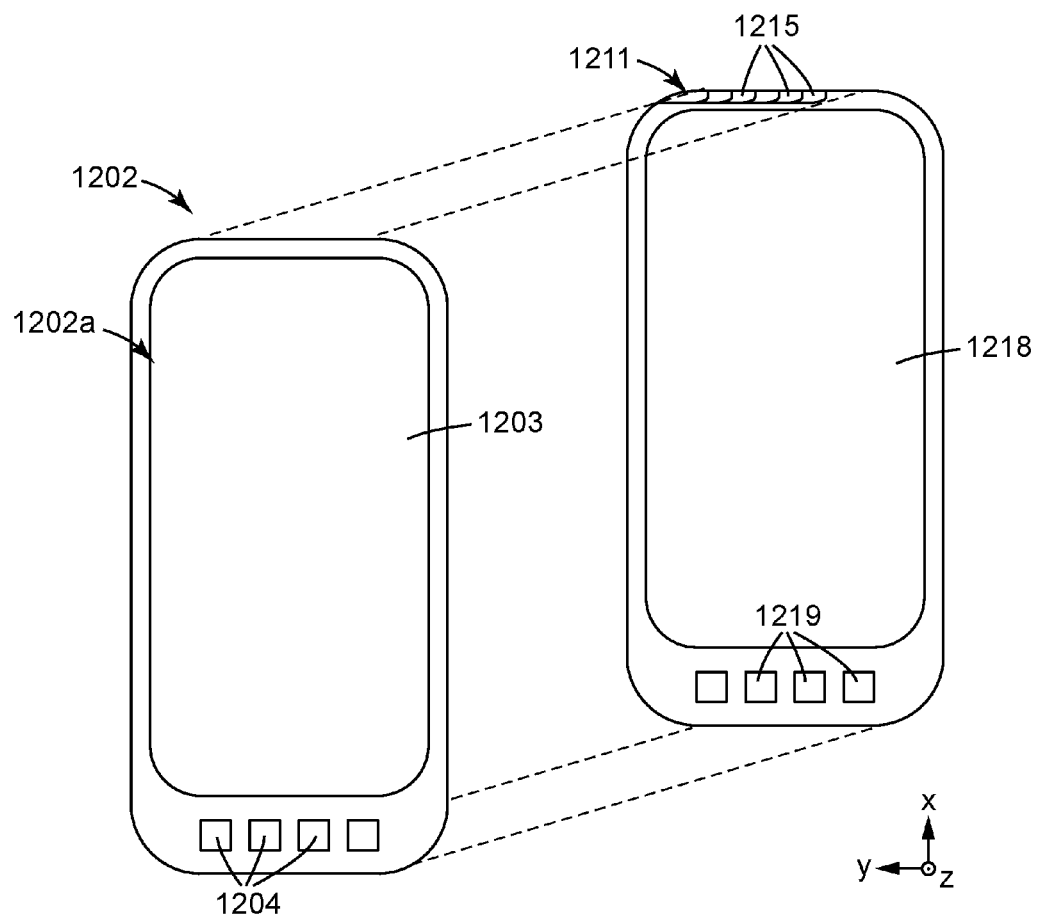
FIG. 12 is a schematic view of an electronic device in combination with a molded multilayered polymer film that can be applied to a contoured surface of the device as a workpiece.

After the post-forming or molding of FIG. 1, if desired, the molded film can be adhered or otherwise attached to another workpiece, e.g., a useful object or device such as a telephone, telephone accessory, or telephone component, a TV remote, a keyboard, a keypad, a display device, or any other suitable useful object having a contoured surface. An example of this is shown in FIG. 12. Here, a molded multilayered polymer film 1211 as disclosed herein is applied to a workpiece 1202. The workpiece is a handheld electronic device with a display 1203 and buttons 1204, the display 1203 being flat but recessed relative to its surroundings, and the buttons 1204 protruding from their surroundings. The buttons can be activated by depressing them at least some amount vertically, i.e., along the z-direction. The display 1203 and buttons 1204 form part of a front surface 1202a of the workpiece 1202, the front surface being contoured due to the varying heights of portions of the surface along the z-direction. The molded film 1211 has been molded e.g. using the procedure of FIG. 11 so that it retains a contoured shape, the contoured shape including a flat recessed area 1218 to correspond to the display 1203, and protuberances 1219 to correspond to the buttons 1204. The molded film 1211 may also include access tabs 1215, which may be the same as or similar to access tabs 615 discussed above, to facilitate the delamination of individual layer packets from the film 1211. The molded film 1211 may be substantially optically clear and may include an optically clear adhesive backing layer so that it can be adhered or otherwise attached to the front contoured surface 1202a of the workpiece 1202, and so that, after such attachment, the user can still view the information on the display 1203 and operate the buttons 1204. In this regard, in addition to having the self-supporting contoured shape, the molded film 1211 is also preferably flexible so that a user who uses a finger to press on the protuberances 1219 can easily activate the corresponding buttons 1204.

Examples

The foregoing principles were used to fabricate several molded multilayered polymer films having the delamination properties and contoured surface characteristic discussed above.

Three coextruded multilayered polymer films were fabricated and then thermoformed (post-formed) to provide a self-supporting contoured shape that corresponded to the contoured surface of a useful object.

A multilayered polymer film 1 used a polymer layer stack having a repeating ABC layer arrangement similar to that shown in FIG. 7. For this film 1, the A, B, and C layers were composed of polymer compositions A, B, and C, respectively, as follows:

polymer composition A: polyethylene terephthalate (PET), specifically, product code 1N404 from Nan Ya Plastics Corp. USA, Livingston, N.J.;

polymer composition B: PETg copolyester, specifically, product code EASTAR GN071 from Eastman Chemical Co., Kingsport, Tenn.; and polymer composition C: a blend of 80 wt. % polypropylene (product code SR549M from LyondellBasell Company) and 20 wt. % of a styrene ethylene propylene styrene (SEPS) block copolymer resin (product code KRATON G1657 from Kraton Performance Polymers Inc., Houston, Tex.).

These materials are all coextrudable with each other and are all melt processable at a temperature of 204 degrees C. (400 degrees F.) or greater. These materials were heated and coextruded using a 16-layer feedblock that was fed by three extruders—one containing polymer composition A, one containing polymer composition B, and one containing polymer composition C. The 16-layer extrudate flowed into a 13.25 inch (approx. 337 mm) die, and was cast onto a chilled casting wheel with electrostatic pinning, which produced the multilayered polymer film 1. The extruders, die, and feedblock were heated to temperatures of 500 to 530 degrees F. (260 to 277 C) during the extrusion of this film sample. After casting, the film 1 was biaxially stretched and oriented.

Of the 16 total polymer layers in the multilayered polymer film 1, 15 of these layers formed a polymer layer stack with the layers arranged in a repeating ABC pattern similar to that shown in FIG. 7, but with 5 layer packets. One A layer was at the top or front of each layer packet, one B layer was in the interior of each layer packet, and one C layer was at the bottom or back of each layer packet. The physical thickness of each A layer was 0.70 mils (18 microns), the physical thickness of each B layer was 0.15 mils (3.8 microns), and the physical thickness of each C layer was 0.15 (3.8 microns) mils. To this stack of 5 ABC layer packets was added, at the back-most or bottom-most C layer, one additional (coextruded) layer of polymer composition A, this additional A layer having a physical thickness of 0.70 mils (18 microns). The total caliper or physical thickness of the multilayered polymer film 1 was thus 5.7 mils (145 microns). The multilayered polymer film 1 had a clear, light-transmissive appearance.

A multilayered polymer film 2 was substantially the same, and made in the same way, as the multilayered polymer film 1, except that the speed of the casting wheel was changed to reduce the thickness of the overall film and its constituent layers. Thus, the multilayered polymer film 2 had 16 total polymer layers arranged in the same way as in the multilayered polymer film 1, but the physical thickness of each A layer was 0.32 mils (8.1 microns), the physical thickness of each B layer was 0.07 mils (2 microns), and the physical thickness of each C layer was 0.07 (2 microns) mils. The total caliper or physical thickness of the multilayered polymer film 2 was thus 2.65 mils (67.3 microns). The multilayered polymer film 2 had a clear, light-transmissive appearance.

A multilayered polymer film 3 used a polymer layer stack having a repeating ABC layer arrangement similar to that shown in FIG. 7. For this film 3, the A, B, and C layers were composed of polymer compositions A, B, and C, respectively, as follows:

polymer composition A: a blend of 94 wt. % polyethylene terephthalate (PET), specifically, product code 1N404 from Nan Ya Plastics Corp. USA, Livingston, N.J., and 6 wt. % of polypropylene (product code PP3230 from Total Petrochemicals USA, Houston, Tex.);

polymer composition B: PETg copolyester, specifically, product code EASTAR GN071 from Eastman Chemical Co., Kingsport, Tenn.; and polymer composition C: a blend of 90 wt. % polypropylene (product code SR549M from LyondellBasell Company) and 10 wt. % of a styrene ethylene propylene styrene (SEPS) block copolymer resin (product code KRATON G1657 from Kraton Performance Polymers Inc., Houston, Tex.).

These materials are all coextrudable with each other and are all melt processable at a temperature of 204 degrees C. (400 degrees F.) or greater. These materials were heated and coextruded using a 16-layer feedblock that was fed by three extruders—one containing polymer composition A, one containing polymer composition B, and one containing polymer composition C. The 16-layer extrudate flowed into a 13.25 inch (approx. 337 mm) die, and was cast onto a chilled casting wheel with electrostatic pinning, which produced the multilayered polymer film 3. The extruders, die, and feedblock were heated to temperatures of 500 to 530 degrees F. (260 to 277 C) during the extrusion of this film sample. After casting, the film 3 was biaxially stretched and oriented.

Of the 16 total polymer layers in the multilayered polymer film 3, 15 of these layers formed a polymer layer stack with the layers arranged in a repeating ABC pattern similar to that shown in FIG. 7, but with 5 layer packets. One A layer was at the top or front of each layer packet, one B layer was in the interior of each layer packet, and one C layer was at the bottom or back of each layer packet. The physical thickness of each A layer was 0.60 mils (15 microns), the physical thickness of each B layer was 0.13 mils (3.3 microns), and the physical thickness of each C layer was 0.13 (3.3 microns) mils. To this stack of 5 ABC layer packets was added, at the back-most or bottom-most C layer, one additional (coextruded) layer of polymer composition A, this additional A layer having a physical thickness of 0.60 mils (15 microns). The total caliper or physical thickness of the multilayered polymer film 3 was thus 5.0 mils (127 microns). The multilayered polymer film 3 had a white and opaque appearance, due to substantial light scattering produced by the immiscibility of the two polymers used to make the polymer A layers.

The multilayered polymer films 1, 2, and 3 were each adapted for, and capable of, successive irreversible delamination between layer packets as described herein.

The multilayered polymer films 1, 2, and 3 were each then post-formed or molded by thermoforming against a telephone base which had a contoured surface and served as a mold. For the molding procedure, a piece of the multilayered polymer film was placed in a large rectangular frame, which tautly held the film. The frame with the film was then placed in an oven for pre-heating, which softened the film. The oven temperature is referred to as "pre-heat temp". After a specified time ("pre-heat time") in the oven, the frame with the film was quickly transferred to a vacuum pump station, where an actual telephone base rested on a flat surface that was coupled to a vacuum, the telephone base and flat surface being at room temperature. The flat surface had a thru-hole underneath the telephone base that was coupled to a vacuum, and when vacuum was applied, the force of the atmosphere pressed portions of the (still heated) film against the contoured surface of the telephone base, and pressed other portions of the film against the flat surface. After a specified time ("forming time"), the vacuum at the vacuum pump station was turned off, the film was allowed to cool, and the cooled (and molded) film was separated from the telephone base (mold). For reference purposes, we refer to the multilayered polymer films 1, 2, and 3 after this post-forming or molding procedure as molded multilayered polymer films 1', 2', and 3' respectively. The post-forming conditions that were used are as follows:

|  | pre-heat temp (degrees F.) | pre-heat time (seconds) | forming time (seconds) |
| --- | --- | --- | --- |
| multilayered polymer film 1/1' | 400 | 90 | 45 |
| multilayered polymer film 2/2' | 400 | 75 | 45 |
| multilayered polymer film 3/3' | 400 | 90 | 45 |

Figure 13A:
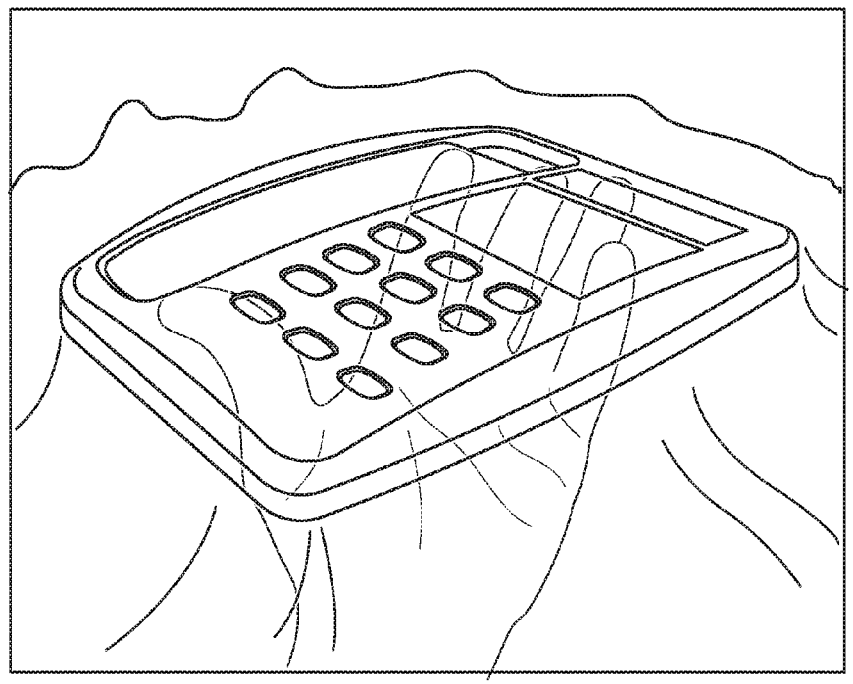
FIG. 13A is a photograph of a peelable multilayered polymer film after it was molded to have a self-supporting contoured shape corresponding to a telephone base.

FIG. 13A is a photograph of the molded multilayered polymer film 2' after separation from the telephone base (mold). In the photograph, the molded film 2' is only lightly supported by the person's hand, and it can be seen to have a self-supporting contoured shape that is substantially similar to the contour of the upper- and side-surfaces of the telephone base. If placed on a flat tabletop, the molded film 2' also retains the self-supporting contoured shape for an indefinite length of time, e.g., for hours, days, and weeks, under the force of gravity, even though the molded film could be easily bent or flexed by hand manipulation. The molded films 1' and 3' exhibited substantially similar self-supporting contoured shapes and flexure properties.

Figure 13B:
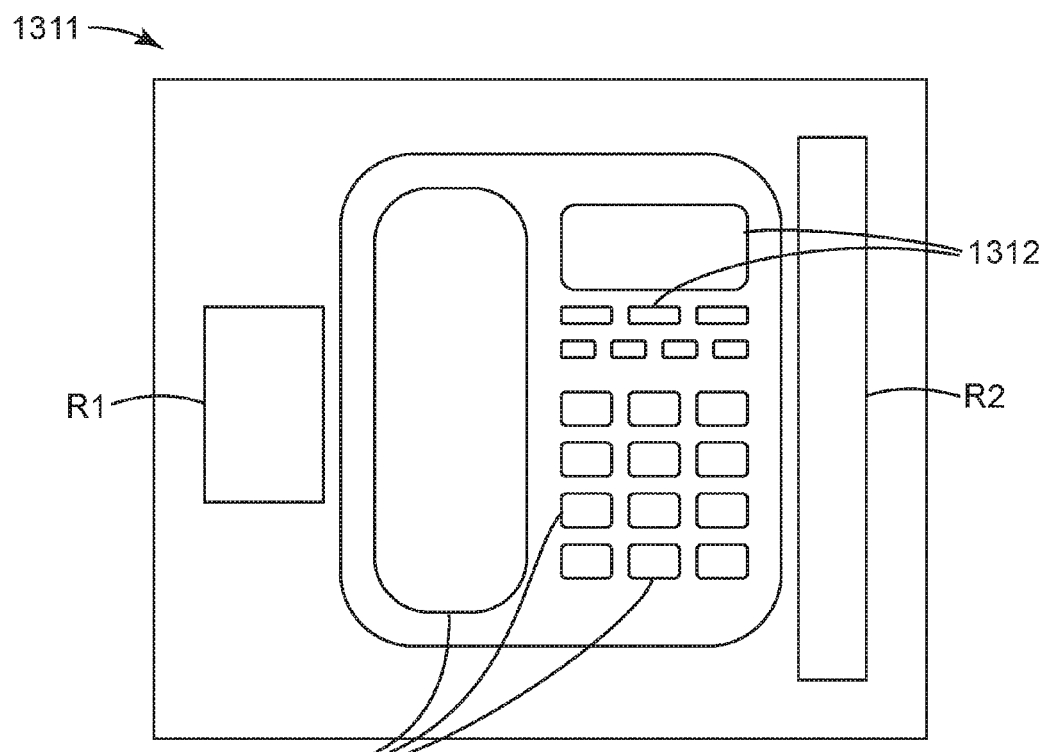
FIG. 13B is a schematic top or plan view of the molded polymer film of FIG. 13A, with haze and peel force measurement areas identified.

FIG. 13B is a schematic top or plan view of a molded polymer film 1311 which may represent any of the molded films 1', 2', or 3'. The molded film 1311 has a contoured shape, with features 1312 representing localized protuberances and depressions. The largest feature 1312 is a depression which is sized for placement of a telephone handset, the next-to-largest feature 1312 corresponds to a display on the telephone base, and the smaller features 1312 are protuberances corresponding to buttons on the telephone base. Regions R1 and R2, which are drawn approximately to scale, are portions of a relatively flat area of the molded film 1311. The region R1 was used to measure the optical haze of the molded film. The region R2 was used to measure the peel force (bond strength, peel strength) between adjacent layer packets in the polymer layer stacks.

The optical haze of the molded films 1', 2', and 3' was measured with a Haze-Gard Plus hazemeter, which is commercially available from BYK Instruments. The optical haze of the corresponding original multilayered polymer films 1, 2, and 3 (before molding) was also measured. The results are as follows:

| | measured haze (%) |
|---|---|
| multilayered polymer film 1 | 2.9 |
| molded multilayered polymer film 1' | 1.3 |
| multilayered polymer film 2 | 0.7 |
| molded multilayered polymer film 2' | 1.2 |
| multilayered polymer film 3 | 97.4 |
| molded multilayered polymer film 3' | 97.1 |

The molded films 1', 2', and 3' were found to preferentially irreversibly delaminate at interfaces between the ABC layer packets, like their corresponding original multilayered polymer films 1, 2, and 3. The peel force of the molded films 1', 2', 3' was measured (see region R2 in FIG. 13B) using an Imass Slip-Peel Tester Model SP-2000, with the film portion of interest taped to a rigid flat glass plate. The peel force was measured sequentially for each of the 5 layer packets in the molded films, with each peel force measurement taken as follows: 90 degree peel; 60 inches/minute slide speed; the slide direction was parallel to the machine direction of the film; and the peel force was averaged over the travel distance of the peel. The peel force of the 5 layer packets of the corresponding original multilayered polymer films 1, 2, and 3 (before molding) was also measured. The resulting peel force values, given in grams/inch, as well as the average peel force for all 5 of the layer packets for each film, are as follows, where LP1 refers to the top-most or upper-most ABC layer packet, LP2 refers to the ABC layer packet directly beneath the LP1 layer packet, LP3 refers to the ABC layer packet directly beneath the LP2 layer packet, and so forth, and LP avg refers to the average of the five layer packet values:

| | LP 1 | LP2 | LP3 | LP4 | LP5 | LP avg |
|---|---|---|---|---|---|---|
| film 1 | 16.2 | 12.7 | 14.5 | 13.8 | 12.9 | 14.0 |
| film 1' | 15.4 | 17.3 | 16.3 | 14.8 | 12.2 | 15.2 |
| film 2 | 10.5 | 12.4 | 10.5 | 9.3 | 7.7 | 10.1 |
| film 2' | 17.9 | 15.2 | 5.7 | 6.1 | 5.3 | 10.0 |
| film 3 | 17.2 | 16.3 | 20.1 | 12.2 | 9.0 | 15.0 |
| film 3' | 14.8 | 10.1 | 19.2 | 12.1 | 12.1 | 13.7 |

Figure 14:
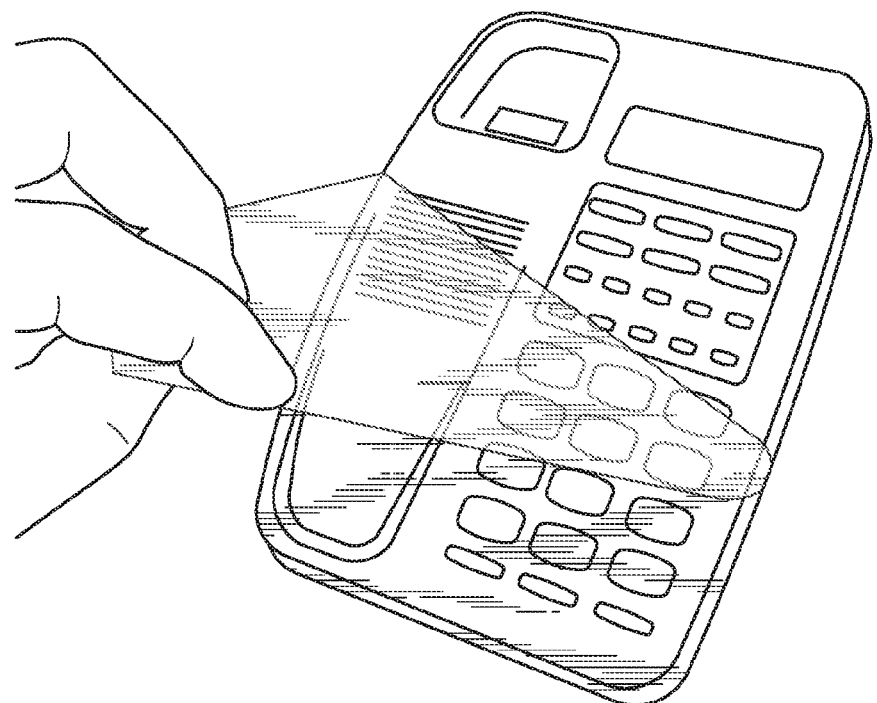
FIG. 14 is a photograph of a molded polymer film similar to that of FIG. 13A in combination with, and attached to, a telephone base, the photograph also showing one of the layer packets being delaminated from the remainder of the molded film.

As noted above, the molded multilayer polymer films 1', 2', 3' were found to preferentially irreversibly delaminate at interfaces between the five ABC layer packets. Each of these molded films could be attached to the same telephone base which previously served as its mold, e.g. with a suitable adhesive. Protuberances of the molded film that corresponded to operable buttons of the phone base (see the smaller features 1312 in FIG. 13B) were not as prominent as they could have been, due to movement of the buttons downward or into the phone base during molding; nevertheless, such protuberances still had shapes that fit snugly around the various features of the contoured surface of the phone base, leaving clean impressions with good detail. Also, with the molded film firmly in place covering the upper and side surfaces of the phone base, the buttons on the phone base could still be easily activated by finger touch due to the flexibility of the molded film. FIG. 14 is a photograph of the molded multilayered polymer film 2' after it was attached to the telephone base which previously served as its mold, and after removal of excess molded film portions. Attachment of the molded film to the phone base was made using small pieces of a removable double-coated tape (3M™ Scotch™ m 667 Removable Double-Sided Tape) located at select points along the edges of the phone base. The photograph also shows one of the ABC layer packets being irreversibly delaminated from the remainder of the molded film 2' by hand manipulation.

Other workpieces were also used as molds with which to impart a contoured shape to the moldable films. In particular, a telephone handset (of the type that fits within the large depression that can be seen in the telephone base in FIG. 14), a 3 inch radius hemisphere, and a TV remote (having push-buttons for remotely operating a television) were tested. For each of these workpieces or molds, the multilayered polymer films 1, 2, and 3 could be molded against the pertinent contoured surface of the workpiece to form a self-supporting contoured shape, and the layer packets of the molded film could be individually and cleanly removed from the remainder of the molded film.

Figure 15:
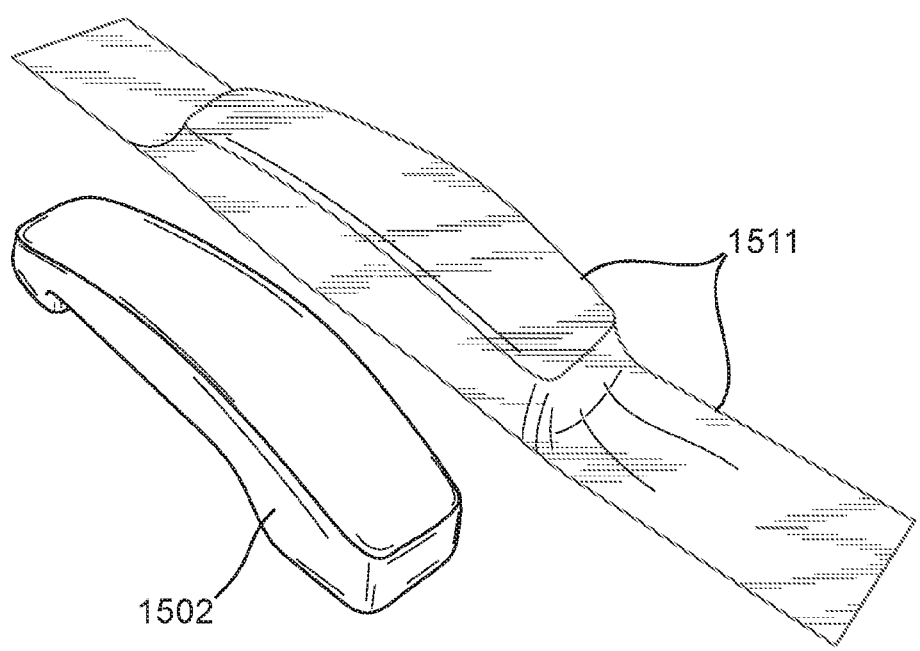
FIG. 15 is a photograph of a peelable multilayered polymer film after it was molded to have a self-supporting contoured shape corresponding to a telephone handset, the molded film resting on a surface alongside the telephone handset.

FIG. 15 shows a photograph of a piece of molded multilayered polymer film 1511 lying on a tabletop next to a telephone handset 1502. The molded film 1511 was made using the multilayered polymer film 3 as a starting material, and was molded against the handset 1502 during the molding operation. Excess molded material can be seen at the extreme ends of the molded film 1511, which excess material can be readily trimmed before attaching the molded film 1511 to a suitable workpiece such as the handset 1502, or a substantially identical or similar phone handset.

Figure 16:
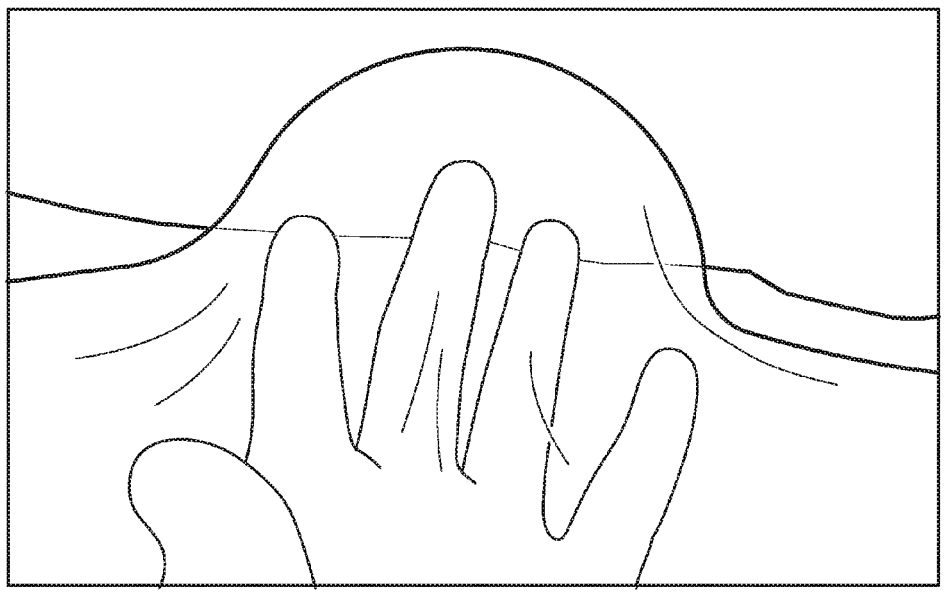
FIG. 16 is a photograph of a peelable multilayered polymer film after it was molded to have a self-supporting contoured shape of a hemisphere.

A piece of the multilayered polymer film 1 was post-formed or molded against a hemispherical mold of 3 inch (76 mm) radius. A photograph of the resulting molded multilayered polymer film, with a contoured (hemispherical) self-supporting shape, is shown lightly supported by a person's hand in FIG. 16. The layer packets of this molded film could be individually and cleanly removed from the remainder of the molded film.

Figure 17A:
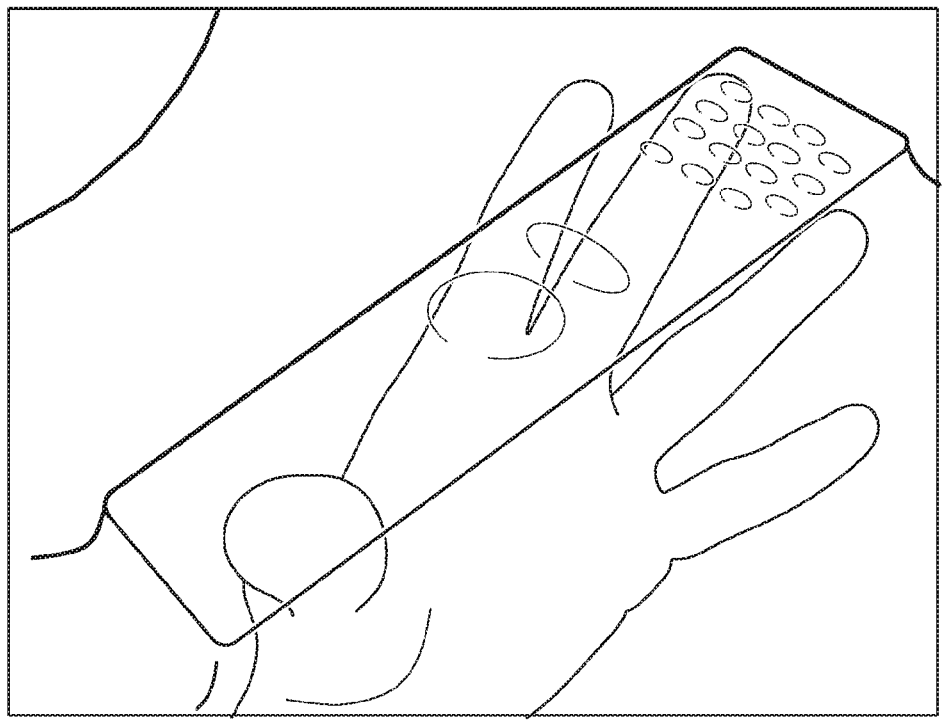
FIG. 17A is a photograph of a peelable multilayered polymer film after it was molded to have a self-supporting contoured shape corresponding to a TV remote.
Figure 17B:
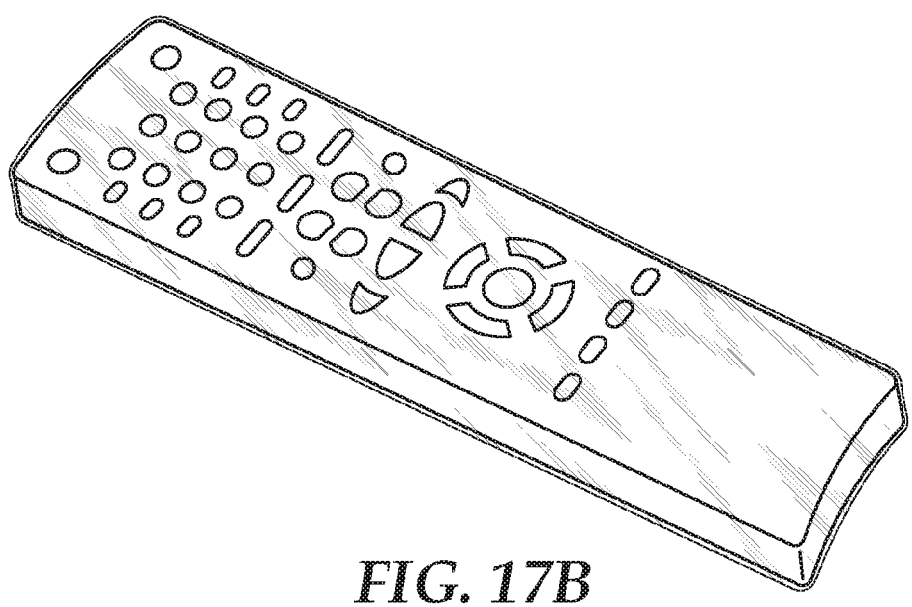
FIG. 17B is a photograph of the molded polymer film of FIG. 17A in combination with, and attached to, the TV remote.

A piece of the multilayered polymer film 2 was post-formed or molded against a TV remote. A photograph of the resulting molded multilayered polymer film, with a contoured self-supporting shape corresponding substantially to that of the TV remote, is shown lightly supported by a person's hand in FIG. 17A. The layer packets of this molded film could be individually and cleanly removed from the remainder of the molded film. FIG. 17B is a photograph of the resulting molded multilayered polymer film after it was attached to the TV remote which previously served as its mold, and after removal of excess molded film portions. Attachment of the molded film to the TV remote was made using small pieces of a removable double-coated tape (3M™ Scotch™ 667 Removable Double-Sided Tape) located at select points along the edges of the TV remote.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

This application discloses a variety of items relating to post-formed multilayered polymer films. These include, but are not limited to, the numbered items below.

Item 1 is a film comprising a stack of polymer layers, the polymer layers being organized into layer packets, each of the layer packets having at least two of the polymer layers;
   wherein attachment between adjacent layer packets is weak enough to permit the layer packets to be separately irreversibly delaminated from a remainder of the stack, and the stack is configured to promote such irreversible delamination between such layer packets;
   wherein all of the polymer layers in the stack of polymer layers have respective polymer compositions that are coextrudable with each other; and
   wherein the film has a self-supporting contoured shape.

Item 2 is the film of item 1, wherein the contoured shape comprises a region that is curved in a first cross-sectional plane but not curved in a second cross-sectional plane perpendicular to the first cross-sectional plane.

Item 3 is the film of any previous item, wherein the contoured shape comprises a region that is curved in a first cross-sectional plane and also curved in a second cross-sectional plane perpendicular to the first cross-sectional plane.

Item 4 is the film of any previous item, wherein the stack is configured such that for every pair of adjacent layer packets in the stack, attachment between the layer packets is weaker than attachment between the polymer layers within the layer packets, such that irreversible delamination tends to occur between the layer packets rather than within the layer packets.

Item 5 is the film of item 4, wherein an attachment between adjacent layer packets is characterized by a first peel force, and wherein a weakest attachment of polymer layers within each layer packet is characterized by a second peel force, and wherein the second peel force is at least two times the first peel force.

Item 6 is the film of any previous item, wherein an attachment between any two adjacent layer packets is characterized by a peel force in a range from 2 to 100 grams per inch (0.8 to 38.6 N/m).

Item 7 is the film of any previous item, wherein the polymer layers are arranged in a repeating AB sequence.

Item 8 is the film of items 1 through 6, wherein the polymer layers are arranged in a repeating ABC sequence.

Item 9 is the film of item 8, wherein attachment between polymer layers A and C is weaker than attachment between polymer layers A and B, and is also weaker than attachment between polymer layers B and C.

Item 10 is the film of any previous item, wherein all of the polymer layers in the stack of polymer layers have respective polymer compositions that are melt processable at a melt temperature of 204 degrees C. (400 degrees F.) or greater.

Item 11 is the film of any previous item, wherein at least some of the polymer layers in the stack are oriented and have a birefringence of at least 0.05.

Item 12 is the film of any previous item, wherein none of the polymer layers that are disposed at interfaces of adjacent layer packets are tacky at room temperature.

Item 13 is the film of any previous item, wherein each of the layer packets in the stack has a thickness of no more than 2 mils (50 microns).

Item 14 is the film of any previous item, wherein the polymer layers are organized into at least N layer packets, where N is at least 5.

Item 15 is the film of item 14, wherein N is at least 10, and wherein the film has an overall thickness of no more than 15 mils (380 microns).

Item 16 is a combination, comprising:
   an article comprising a contoured surface; and
   the film of any previous item attached to the article, the contoured shape of the film mating with the contoured surface of the article.

Item 17 is the combination of item 16, wherein the article includes a display having a display surface, the display surface being part of the contoured surface.

Item 18 is the combination of item 16 or item 17, wherein the article includes a component having a moveable surface, the moveable surface being part of the contoured surface, and wherein the film mates with the moveable surface and flexes to accommodate movement of the component.

Item 19 is the film of any of items 1 through 15, wherein the stack of polymer layers has an average transmission over visible wavelengths of at least 80% and an optical haze of less than 15%.

Item 20 is the film of item 19, wherein the stack of polymer layers has an optical haze of less than 8%.

Item 21 is the film of any of items 1-15, 19, or 20, wherein the stack is configured with access tabs that provide access to interfaces between adjacent layer packets.

Item 22 is the film of item 21, wherein the access tabs are defined by a set of kiss-cut holes of different depths.

Item 23 is the film of any of items 1-15 or 19-22, wherein the stack of polymer layers comprises markings that indicate how many layer packets are present in the film.

Item 24 is a method, comprising:
   providing a multilayered polymer film comprising a stack of polymer layers, the polymer layers being organized into layer packets, each of the layer packets having at least two of the polymer layers, attachment between adjacent layer packets being weak enough to permit the layer packets to be separately irreversibly delaminated from a remainder of the stack, all of the polymer layers in the stack of polymer layers having respective polymer compositions that are coextrudable with each other;
   providing a workpiece having a contoured workpiece surface;
   heating the multilayered polymer film;
   molding the heated multilayered polymer film against the contoured workpiece surface to deform the film into a contoured shape that mates with the contoured workpiece surface; and
   cooling the film such that the film with its contoured shape becomes self-supporting.

Item 25 is the method of item 24, wherein the respective polymer compositions have respective glass transition temperatures, and wherein the heating includes heating the film above at least one such glass transition temperature.

Item 26 is the method of any of items 24 or 25, further comprising:
   separating the molded film from the workpiece.

Item 27 is the method of any of items 24-26, wherein the separate irreversible delamination capability of layer packets in the multilayered polymer film is substantially maintained after the heating, molding, and cooling procedures.

Item 28 is the method of any of items 24-27, wherein the providing comprises coextruding the polymer compositions at an elevated temperature, and wherein the heating is at least partially accomplished as a result of the coextruding.

The invention claimed is:

1. A film comprising a stack of polymer layers, the polymer layers being organized into layer packets, each of the layer packets having at least two of the polymer layers;
wherein attachment between adjacent layer packets is weak enough to permit the layer packets to be separately irreversibly delaminated from a remainder of the stack, and the stack is configured to promote such irreversible delamination between such layer packets;
wherein all of the polymer layers in the stack of polymer layers have respective polymer compositions that are coextrudable with each other;
wherein the film has a self-supporting contoured shape; and
wherein an attachment between any two adjacent layer packets is characterized by a peel force in a range from 2 to 100 grams per inch (0.8 to 38.6 N/m).

2. The film of claim 1, wherein the contoured shape comprises a region that is curved in a first cross-sectional plane but not curved in a second cross-sectional plane perpendicular to the first cross-sectional plane.

3. The film of claim 1, wherein the contoured shape comprises a region that is curved in a first cross-sectional plane and also curved in a second cross-sectional plane perpendicular to the first cross-sectional plane.

4. The film of claim 1, wherein the stack is configured such that for every pair of adjacent layer packets in the stack, attachment between the layer packets is weaker than attachment between the polymer layers within the layer packets, such that irreversible delamination tends to occur between the layer packets rather than within the layer packets.

5. The film of claim 4, wherein an attachment between adjacent layer packets is characterized by a first peel force, and wherein a weakest attachment of polymer layers within each layer packet is characterized by a second peel force, and wherein the second peel force is at least two times the first peel force.

6. The film of claim 1, wherein the polymer layers are arranged in a repeating AB sequence.

7. The film of claim 1, wherein the polymer layers are arranged in a repeating ABC sequence.

8. The film of claim 7, wherein attachment between polymer layers A and C is weaker than attachment between polymer layers A and B, and is also weaker than attachment between polymer layers B and C.

9. The film of claim 1, wherein all of the polymer layers in the stack of polymer layers have respective polymer compositions that are melt processable at a melt temperature of 204 degrees C. (400 degrees F.) or greater.

10. The film of claim 1, wherein none of the polymer layers that are disposed at interfaces of adjacent layer packets are tacky at room temperature.

11. The film of claim 1, wherein each of the layer packets in the stack has a thickness of no more than 2 mils (50 microns).

12. The film of claim 1, wherein the polymer layers are organized into at least N layer packets, where N is at least 5.

13. The film of claim 12, wherein N is at least 10, and wherein the film has an overall thickness of no more than 15 mils (380 microns).

14. A combination, comprising:
an article comprising a contoured surface; and
the film of claim 1 attached to the article, the contoured shape of the film mating with the contoured surface of the article.

15. The combination of claim 14, wherein the article includes a display having a display surface, the display surface being part of the contoured surface.

16. The combination of claim 14, wherein the article includes a component having a moveable surface, the moveable surface being part of the contoured surface, and wherein the film mates with the moveable surface and flexes to accommodate movement of the component.

17. The film of claim 1, wherein the stack of polymer layers has an average transmission over visible wavelengths of at least 80% and an optical haze of less than 15%.

18. The film of claim 17, wherein the stack of polymer layers has an optical haze of less than 8%.

19. The film of claim 1, wherein the stack of polymer layers comprises markings that indicate how many layer packets are present in the film.

20. A film comprising a stack of polymer layers, the polymer layers being organized into layer packets, each of the layer packets having at least two of the polymer layers;
wherein attachment between adjacent layer packets is weak enough to permit the layer packets to be separately irreversibly delaminated from a remainder of the stack, and the stack is configured to promote such irreversible delamination between such layer packets;
wherein all of the polymer layers in the stack of polymer layers have respective polymer compositions that are coextrudable with each other;
wherein the film has a self-supporting contoured shape; and
wherein at least some of the polymer layers in the stack are oriented and have a birefringence of at least 0.05.

21. A film comprising a stack of polymer layers, the polymer layers being organized into layer packets, each of the layer packets having at least two of the polymer layers;
wherein attachment between adjacent layer packets is weak enough to permit the layer packets to be separately irreversibly delaminated from a remainder of the stack, and the stack is configured to promote such irreversible delamination between such layer packets;
wherein all of the polymer layers in the stack of polymer layers have respective polymer compositions that are coextrudable with each other;
wherein the film has a self-supporting contoured shape;
wherein the stack is configured with access tabs that provide access to interfaces between adjacent layer packets; and
wherein the access tabs are defined by a set of kiss-cut holes of different depths.

* * * * *